United States Patent
Wu et al.

(10) Patent No.: US 10,838,083 B2
(45) Date of Patent: Nov. 17, 2020

(54) ALKALI AND ALKALINE EARTH HALIDES AND METHODS THEREOF

(71) Applicant: University of Tennessee Research Foundation, Knoxville, TN (US)

(72) Inventors: Yuntao Wu, Knoxville, TN (US); Charles L. Melcher, Oak Ridge, TN (US)

(73) Assignee: University of Tennessee Research Foundation, Knoxville, TN (US)

(*) Notice: Subject to any disclaimer, the term of this patent is extended or adjusted under 35 U.S.C. 154(b) by 0 days.

(21) Appl. No.: 16/274,828

(22) Filed: Feb. 13, 2019

(65) Prior Publication Data
US 2019/0250286 A1    Aug. 15, 2019

Related U.S. Application Data

(60) Provisional application No. 62/630,355, filed on Feb. 14, 2018.

(51) Int. Cl.
    *G01T 1/20* (2006.01)
    *C09K 11/77* (2006.01)
    *G01T 1/202* (2006.01)

(52) U.S. Cl.
    CPC ........ *G01T 1/2023* (2013.01); *C09K 11/7733* (2013.01)

(58) Field of Classification Search
    None
    See application file for complete search history.

(56) References Cited

U.S. PATENT DOCUMENTS

| 3,373,279 A | * | 3/1968 | Hofstadter | C09K 11/7733 250/483.1 |
|---|---|---|---|---|
| 3,667,921 A | * | 6/1972 | Grodkiewicz | C09K 11/7704 117/76 |
| 3,801,702 A | * | 4/1974 | Donohue | C09K 11/0822 423/263 |
| 5,874,056 A | | 2/1999 | Bludssus et al. | |

(Continued)

FOREIGN PATENT DOCUMENTS

| CN | 103224786 A | 7/2013 |
|---|---|---|
| CN | 105555916 B | 9/2018 |

(Continued)

OTHER PUBLICATIONS

Alekhin et al., "Scintillation properties of and self absorption in SrI2:Eu2+," IEEE Trans. Nucl. Sci. 58, 2519 (2011).

(Continued)

*Primary Examiner* — Thomas R Artman
(74) *Attorney, Agent, or Firm* — Jenkins, Wilson, Taylor & Hunt, P.A.

(57) ABSTRACT

Codoped alkali and alkaline earth halide scintillators are described. More particularly, the scintillators are codoped with tetravalent ions, such as $Ti^{4+}$, $Zr^{4+}$, $Hf^{4+}$, $Ge^{4+}$. The codoping can alter one or more optical and/or scintillation property of the scintillator material. For example, the codoping can improve energy resolution. Radiation detectors comprising the scintillators and methods of detecting high energy radiation using the radiation detectors are also described.

19 Claims, 13 Drawing Sheets

(56) References Cited

U.S. PATENT DOCUMENTS

| | | | |
|---|---|---|---|
| 5,882,548 A * | 3/1999 | Liang | C07C 211/65 |
| | | | 252/301.16 |
| 7,651,632 B2 | 1/2010 | Ferrand et al. | |
| 8,496,851 B2 | 7/2013 | Seitz et al. | |
| 8,575,553 B1 | 11/2013 | Shah et al. | |
| 8,580,149 B2 | 11/2013 | Payne et al. | |
| 8,598,530 B2 | 12/2013 | Zhuravleva et al. | |
| 9,624,429 B2 | 4/2017 | Stand et al. | |
| 9,695,356 B1 | 7/2017 | Stand et al. | |
| 9,896,462 B1 | 2/2018 | Ma et al. | |
| 10,221,355 B2 * | 3/2019 | Stand | G01T 1/2018 |
| 10,591,617 B2 * | 3/2020 | Wu | C09K 11/06 |
| 2007/0090328 A1 | 4/2007 | Dorenbos et al. | |
| 2010/0078595 A1 | 4/2010 | Eriksson et al. | |
| 2011/0260107 A1 | 10/2011 | Spurrier et al. | |
| 2012/0193539 A1 | 8/2012 | Bizarri et al. | |
| 2013/0193329 A1 | 8/2013 | Srivastava | |
| 2014/0183140 A1 | 7/2014 | Atkins et al. | |
| 2015/0353822 A1 | 12/2015 | Tyagi et al. | |
| 2016/0124094 A1 | 5/2016 | Melcher et al. | |
| 2016/0168458 A1 | 6/2016 | Stand et al. | |
| 2016/0289554 A1 | 10/2016 | Dohner et al. | |
| 2016/0293858 A1 | 10/2016 | Brandt et al. | |
| 2017/0160405 A1 | 6/2017 | Kim et al. | |
| 2017/0190969 A1 | 7/2017 | Stand et al. | |
| 2017/0276836 A1 | 9/2017 | Soci et al. | |
| 2017/0355905 A1 * | 12/2017 | Bourret-Courchesne | |
| | | | C09K 11/7733 |
| 2018/0066383 A1 | 3/2018 | Bakr et al. | |
| 2018/0105745 A1 | 4/2018 | Stand et al. | |
| 2018/0155620 A1 * | 6/2018 | Stand | G21K 4/00 |
| 2018/0155624 A1 | 6/2018 | Wu et al. | |
| 2018/0204682 A1 | 7/2018 | Vela-Becerra et al. | |
| 2018/0321393 A1 * | 11/2018 | Wu | C01G 25/006 |
| 2019/0250286 A1 * | 8/2019 | Wu | C09K 11/7733 |

FOREIGN PATENT DOCUMENTS

| | | | |
|---|---|---|---|
| EP | 2387040 A2 | 11/2011 | |
| GB | 2499709 A | 8/2013 | |
| JP | 2006526676 A | 11/2006 | |
| JP | 2014534304 A | 12/2014 | |
| WO | WO 2013/055643 A1 | 4/2013 | |
| WO | WO 2014/171985 A2 | 10/2014 | |
| WO | WO 2014/201234 A1 | 12/2014 | |
| WO | WO 2015/010055 A1 | 1/2015 | |

OTHER PUBLICATIONS

Alekhin et al., "Improvement of (-ray energy resolution of LaBr3:Ce3+ scintillation detectors by Sr2+ and Ca2+ co-doping," Appl. Phys. Lett., 102, 161915 (2013) (4 pages).

Boatner et al., "Bridgman growth of large SrI2:Eu2+ single crystals: A high-performance scintillator for radiation detection applications," J. Cryst. Growth, 379, 63 (2013).

Brecher et al., "Suppression of afterglow in CsI:Tl by codoping with Eu2+—I: Experimental," Nucl. Instrum. Methods Phys. Res., Sect. A, 558, 450-457 (2006).

Hall et al., "High Purity Germanium for Detector Fabrication," IEEE Trans. Nucl. Sci., 18, 160 (1971).

Hawrami et al., J. Cryst. Growth, 379, 69 (2013).

Hofstandter, "The detection of gamma-rays with thallium-activated sodium iodine crystals," Phys. Rev. 74, 100 (1948).

Kamada et al., "Alkali earth co-doping effects on luminescence and scintillation properties of Ce doped Gd3Al2Ga2O12 scintillator," Opt. Mater., 41, 63-66 (2015).

Li et al., "Host structure dependence of light yield and proportionality in scintillators in terms of hot and thermalized carrier transport," Phys. Status Solidi RRL, 8, 346-348 (2012).

Lindsey et al., "Crystal growth and characterization of europium doped KCaI3, a high light yield scintillator," Opt. Mater., 48, 1-6 (2015).

Liu et al., "Effect of Mg2+ co-doping on the scintillation performance of LuAG:Ce ceramics," Phys. Status Solidi Rapid Res. Lett., 8, 105 (2014).

Melcher, "Cerium-doped lutetium oxyorthosilicate: a fast, efficient new scintillator," J. Nucl. Med., 41, 1051 (2000).

Moszynski et al., "Absolute light yield of scintillators," IEEE Trans. Nucl. Sci., 44, 1052 (1997).

Nagarkar et al., "Scintillation properties of CsI:Tl crystals codoped with Sm2+," IEEE Trans. Nucl. Sci., 55, 1270-1274 (2008).

Nikl et al., "Defect engineering in Ce-doped aluminum garnet single crystal scintillators," Cryst. Growth Des., 14, 4827 (2014).

Nikl and Yoshikawa, "Recent R&D trends in inorganic single-crystal scintillator materials for radiation detection," Adv. Opt. Mater., 3, 463 (2015).

Nishimoto et al., "Effects of La, Gd, or Lu co-doping on crystal growth and scintillation properties of Eu:SrI2 single crystals," J. Cryst. Growth, 401, 484 (2014).

Quarati et al., "Co-doping of CeBr3 scintillator detectors for energy resolution enhancement," Nucl. Instrum. Methods Phys. Res. A, 735, 655 (2014).

Stand et al., "Growth and characterization of potassium strontium iodide: a new high light yield scintillator with 2.4% energy resolution," Nucl. Instr. Meth. Phys. Res. A, 780, 40-44 (2015).

Wu et al., "Growth of inch-sized KCa0.8Sr0.2I3:Eu2+ scintillating crystals and high performance for gamma-ray detection," CrystEngComm., 18, 7435-7440 (2016).

Wu et al., "Large-size KCa0.8Sr0.2I3:Eu2+ crystals: growth and characterization of scintillation properties," Cryst. Growth Des. 16, 4129-4135 (2016).

Wu et al., "Toward high energy resolution in CsSrI3/Eu2+ scintillating crystals: effects of off-stoichiometry and Eu2+ concentration," Cryst. Growth Des., 16, 7186-7193 (2016).

Wu et al., "Tailoring the properties of europium doped potassium calcium iodide scintillators through defect engineering" Phys. Status Solid (RRL), 12(2), 1700403 (Dec. 15, 2017). DOI: 10.1002/pssr.201700403.

Wu et al., "Effects of zirconium codoping on the optical and scintillation properties of SrI2:Eu2+ single crystals," Nuclear Instruments and Methods in Physics Research Section A: Accelerators, Spectrometers, Detectors, and Associated Equipment (Sep. 20, 2018). 10/1016/j.nima.2018.09.077. (Please send us the published version).

Yang and Menge, "Improving (-ray energy resolution, non-proportionality, and decay time of NaI:Tl+ with Sr2+ and Ca2+ co-doping," J. Appl. Phys., 118, 213106 (2015).

Yokota et al., "Crystal growth of Eu:SrI2 single crystals by micro-pulling-down method and the scintillation properties," J. Cryst. Growth, 375, 49 (2013).

Aberg et al., "Origin of resolution enhancement by co-doping of scintillators: Insight from electronic structure calculations," Appl. Phys. Lett., 104, 211908 (2014) (4 pages).

Blahuta et al., "Evidence and Consequences of Ce4+ in LYSO:Ce,Ca and LYSO:Ce,Mg Single Crystals for Medical Imaging Applications," IEEE Trans. Nucl. Sci., vol. 60, No. 4, pp. 3134-3141 (2013).

Cherepy et al., "Strontium and barium iodide high light yield scintillators," Appl. Phys. Lett., 92, 083508 (2008) (3 pages).

Glodo et al., "Concentration effects in Eu doped SrI2," IEEE Trans. Nucl. Sci., 57(3), 1228 (2010) (22 pages).

Lam et al., "The Influence of Cation Impurities on the Scintillation Performance of SrI2(Eu)," IEEE Trans. Nucl. Sci., vol. 62, No. 6, pp. 3397-3404 (2015).

Lindsey et al., "Multi-ampoule Bridgman growth of halide scintillator crystals using the self-seeding method," J. Cryst. Growth, vol. 470, pp. 20-26 (2017).

Melcher et al., "Scintillator Design via Codoping," JPS Conf. Proc., 11, 020001 (2016) (8 pages).

Meng et al., "Relationship between Ca2+ concentration and the properties of codoped Gd3Ga3Al2O12:Ce scintillators," Nucl. Instrum. Methods Phys. Res., Sect. A, vol. 797, pp. 138-143 (2015).

Spurrier et al., "Effects of Ca2+ co-doping on the scintillation properties of LSO:Ce," IEEE Trans. Nucl. Sci., 5, p. 1178 (2008).

Van Loef et al., "High-energy-resolution scintillator: Ce3+ activated LaBr3," Appl. Phys. Lett., vol. 79, No. 10, pp. 1573-1575 (2001).

(56) References Cited

OTHER PUBLICATIONS

Wu et al., "CsI:Tl+, Yb+: ultra-high light yield scintillator with reduced afterglow," CrystEngComm, vol. 16, pp. 3312-3317 (2014a).
Wu et al., "Role of Ce4+ in the Scintillation Mechanism of Codoped Gd3Ga3Al2O12:Ce," Phys. Rev. Appl., vol. 2, 044009 (2014b) (13 pages).
Wu et al., "Defect engineering in SrI2:Eu2+ single crystal scintillators," Cryst. Growth Des., 15(8), 3929-3938 (2015).
Wu et al., "Quaternary Iodide K(Ca,Sr)I3:Eu2+ Single-Crystal Scintillators for Radiation Detection: Crystal Structure, Electronic Structure, and Optical and Scintillation Properties," Adv. Optical Mater., 4(10), 1420 (2016) (16 pages).
Wu et al., "Defect Engineering by Codoping in KCaI3:Eu2+ Single-Crystalline Scintillators," Phys. Rev. Appl., 8, 034011 (Sep. 15, 2017) (15 pages).
Anisimov et al., "First principles calculations of the electronic structure and spectra of strongly correlated systems: the LDA+U method," J. Phys. Condens. Matter., 9, 767-808 (1997).
Bizzari et al., "Scintillation and optical properties of BaBrI:Eu2+ and CsBa2I5:Eu2+," IEEE Trans. Nucl. Sci., 58, 3403-3410 (2011).
Borade et al. (2011) Scintillation properties of CsBa2Br5:Eu2+. Nuclear Instruments and Methods in Physics Research Section A: Accelerators, Spectrometers, Detectors and Associated Equipment 652(1):260-263.
Bourett-Courchesne et al. (2009) "Eu2+-doped Ba2CsI5, a new high-performance scintillator," Nuclear Instruments and Methods in Physics Research A 612:138-142.
Bourret-Courchesne et al. (2012) Crystal growth and characterization of alkali-earth halide Scintillators. Journal of Crystal Growth. 352:78-83.
Bukhalova et al. (May 1967) The K, Rb, Sr Cl System. Russ J. Inorg. Chem. (English Translation) 12(5):703-705.
Cooke et al., "Thermally stimulated luminescence from x-irradiated porous silicon," Appl. Phys. Lett., 70, 3594 (1997).
Dorenbos, "Fundamental limitations in the performance of Ce3+-, Pr3+-, and Eu2+-activated scintillators," IEEE Trans. Nucl. Sci., 57, 1162-1167 (2010).
Dudarev et al., "Electron-energy-loss spectra and the structural stability of nickel oxide: An LSDA1U study," Phys. Rev. B, 57, 1505-1509 (1998).
Erhart et al., "Extrinsic point defects in aluminum antimonide," Phys. Rev. B, 81, 195216 (2010) (12 pages).
Erhart et al., "First-principles study of codoping in lanthanum bromide," Phys. Rev. B, 91, 165206 (2015) (12 pages).
Feng et al., "Annealing effects on Czochralski grown Lu2Si2O7:Ce3+ crystals under different atmospheres," J. Appl. Phys., 103 083109 (2008).
Fink and Seifert (1980) Über die Systeme des Europium(II)- und Strontiumchlorids mit Alkalimetallchloriden und Thalliumchlroid. Z. Anorg. Allg. Chem. 466:87-96. [abstract].
Giannozzi et al., "Quantum Expresso: a modular and open-source software project for quantum simulations of materials," J. Phys. Condens. Matter, 21, 395502 (2009) (19 pages).
Kang et al., "Emerging New Pseudobinary and Ternary Halides as Scintillators for Radiation Detection," IEEE Transactions on Nuclear Science, pp. 1-9 (Nov. 2016).
Kellner (1917) Die binaren Systeme aus den Bromiden der Alkaliund Erdalkalimetalle. Z. Anorg. Allg. Chem. 37:137-187.
Kim et al. (Sep. 2017) The Characterization of new Eu2+ doped TlSr2I5 Scintillator Crystals. 1-13.
Korshunov et al. (May 1966) Reaction of Europium(III) and Terbium Chlorides with Sodium and Potassium Chlorides. Russ. J. Inorg. Chem. (English translation) 11(5):547-550.
Liu et al., "Towards bright and fast Lu3Al5O12:Ce,Mg optical ceramics scintillators," Adv. Opt. Mater., 4, 731-739 (2016).
Monkhorst and Pack, "Special points for Brillouin-zone integrations," Phys. Rev. B, 13, 5188-5192 (1976).
Notice of Allowance and Fee(s) Due corresponding to U.S. Appl. No. 15/462,391 dated Apr. 19, 2017.

Notice of Allowance and Fee(s) Due Corresponding to U.S. Appl. No. 14/906,199 dated Dec. 2, 2016.
Notice of Allowance corresponding to Chinese Patent Application No. 201480040854.0 dated Jul. 19, 2018.
Notice of Allowance corresponding to U.S. Appl. No. 15/867,314 dated Oct. 11, 2018.
Notice of Allowance corresponding to U.S. Appl. No. 15/970,581 dated Dec. 4, 2019.
Notification of Transmittal of International Preliminary Report on Patentabilty (Chapter II of the Patent Coopertation Treaty) corresponding to PCT/US2014/047248 dated Jul. 20, 2015.
Notification of Transmittal of the International Search Report and the Written Opinion of the International Searching Authority, or the Declaration corresponding to PCT/US2014/047248 dated Nov. 18, 2014.
Office Action corresponding to Chinese Patent Application No. 2014800408540 dated Jan. 3, 2017 (translation included).
Office Action corresponding to Chinese Patent Application No. 201480040854.0 dated Jan. 29, 2018 (translation included).
Office Action corresponding to Chinese Patent Application No. 2014800408540 dated Sep. 21, 2017.
Office Action corresponding to Japanese Patent Application No. 2016-527138 dated Aug. 15, 2017.
Office Action corresponding to Japanese Patent Application No. 2016-527138 dated Jun. 27, 2018.
Office Action corresponding to U.S. Appl. No. 15/634,256 dated Feb. 12, 2018.
Office Action corresponding to U.S. Appl. No. 15/867,314 dated Apr. 24, 2018.
Perdew et al., "Generalized gradient approximation made simple," Phys. Rev. Lett., 77, 3865-3868 (1996).
Riccardi et al. (Mar. 1970) Binary Systems Formed by Alkali Bromides with Barium or Strontium Bromide. Z. Naturforsch A: Astrophys., Phys. Phys. Chem. 25:781-785.
Sasioglu et al., "Effective Coulomb interaction in transition metals from constrained random-phase approximation," Phys. Rev. B, 83, 121101 (2011) (6 pages).
Schilling et al. (1996) Ternäre Bromide und Iodid zweiwertiger Lanthanide und ihre Erdalkal-Anloga vom Typ AMX3 und AM2X5. Z. Anorg. Allg. 622:759-765.
Search Report corresponding to Japanese Patent Application No. 2016-527138 dated Jul. 28, 2017 (translation included); retrieved from Global Dossier Oct. 25, 2018.
Sidletskiy et al., "Crystal composition and afterglow in mixed silicates: the role of melting temperature," Phys. Rev. Applied, 4, 024009 (2015) (36 pages).
Van Loef et al. (Feb. 2010) Crystal Growth and Scintillation Properties of Strontium Iodide Scintillators. IEEE Transactions on Nuclear Science NS-56:869-872.
Wei (2013) Effect of Ba Substitution in CsSrI3:Eu2+. Journal of Crystal Growth 384:27-32.
Wu et al., "Ultralow-concentration Sm codoping in CsI:Tl scintillators: A case of little things can make a big difference," Opt. Mater., 38, 297-300 (2014c).
Wu et al., "Effects of melt aging and off-stoichiometric melts on CsSrI3:Eu2+ single crystal scintillators," Phys. Chem. Chem. Phys., 18, 8453-8461 (2016e).
Yamaji et al. (2011) Crystal Growth and Scintillation Properties of Ce and Eu doped LiSrAlF6. Nuclear Instruments and Methods in Pysics Research A 659:368-372.
Yang et al. (2010) Optical and Scintillation Properties of Single Crystal CsSr1-xEuxI3. IEEE Nuclear Science Symposium Conference Record (NSS/MIC) pp. 1603-1606.
Yang et al. (2011a) Crystal Growth and Scintillation Properties of Cs3EuI5 Crystals 318:833-835.
Yang et al., "Crystal growth and characterization of CsSr1-xEuxI3 high light yield scintillators," Phys. Status Solidi (RRL), 5, 43-45 (2011b).
Yang et al., "Scintillation kinetics and thermoluminescence of SrI2:Eu2+ single crystals," J. Lumin., 132, 1824-1829 (2016).
Zhuraveva et al. (2011) Crystal Growth and Scintillation Properties of Cs3CeCl6 and CsCe2Cl7, 318:809-812.

(56) References Cited

OTHER PUBLICATIONS

Zhuravleva et al. (2012) New Single Crystal Scintillators: CsCaCl3:Eu and CsCaI3:Eu. Journal of Crystal Growth 352:115-119.

* cited by examiner

ALKALI AND ALKALINE EARTH HALIDES AND METHODS THEREOF

RELATED APPLICATIONS

This application claims the benefit of U.S. Provisional Patent Application Ser. No. 62/630,355, filed Feb. 14, 2018; the disclosure of which is incorporated herein by reference in its entirety.

TECHNICAL FIELD

The presently disclosed subject matter relates to methods of altering the optical and/or scintillation properties of alkali and alkaline earth halide scintillators and to alkali and alkaline earth halide scintillators that are codoped with tetravalent cations. The presently disclosed subject matter further relates to radiation detectors comprising the scintillator materials, to methods of using the scintillator materials to detect radiation, and to methods of preparing the scintillator materials.

Abbreviations

%=percentage
° C.=degrees Celsius
$\lambda_{em}$=emission wavelength
$\lambda_{ex}$=excitation wavelength
μs=microsecond
at %=atomic percentage
Ba=barium
Be=beryllium
Br=bromine
Ca=calcium
Ce=cerium
Cl=chlorine
Cs=cesium
cm=centimeter
CT=computed tomography
Eu=europium
F=fluorine
Ge=germanium
Hf=hafnium
I=iodine
In=indium
K=potassium or Kelvin
Li=lithium
LY=light yield
MeV=megaelectronvolt
Mg=magnesium
mm=millimeter
mol %=mole percent
Na=sodium
nm=nanometer
ns=nanoseconds
PET=positron emission tomography
ph=photons
PL=photoluminescence
PMT=photomultiplier tube
ppm=part-per-million
Pr=praseodymium
Rb=rubidium
RL=radioluminescence
SPECT=single photon emission computed tomography
Sr=strontium
Ti=titanium
Tl=thallium
TL=thermoluminescence
Yb=ytterbium
Zr=zirconium

BACKGROUND

Scintillator materials, which emit light pulses in response to impinging radiation, such as X-rays, gamma rays, and thermal neutron radiation, are used in detectors that have a wide range of applications in medical imaging, particle physics, geological exploration, security and other related areas. Considerations in selecting scintillator materials typically include, but are not limited to, luminosity, decay time, energy resolution, and emission wavelength.

While a variety of scintillator materials have been made, there is a continuous need for additional scintillator materials, e.g., to meet one or more particular needs of different applications.

SUMMARY

In some embodiments, the presently disclosed subject matter provides a scintillator material comprising one of Formulas (I) or (II):

$$(A_{1-x-y}M_xM'_y)X \qquad (I); \text{ or}$$

$$(A'_{1-x-y}M_xM'_y)X_2 \qquad (II);$$

wherein: $0.0001 \leq x \leq 0.1$; $0.0001 \leq y \leq 0.005$; A is one or more alkali metal; A' is one or more alkaline earth metal; M is a dopant ion selected from the group comprising In, Tl, Ce, Pr, Nd, Sm, Eu, Gd, Tb, Yb, Bi, Sb, and combinations thereof; M' is a tetravalent codopant ion or a combination of tetravalent codopant ions; and X is one or more halogen.

In some embodiments, A is selected from Li, Na, K, Rb, Cs, and combinations thereof. In some embodiments, A' is selected from Mg, Ca, Sr, Ba, and combinations thereof. In some embodiments, A' is Sr.

In some embodiments, X is selected from Cl, Br, I, and combinations thereof. In some embodiments, X is I.

In some embodiments, M is Eu. In some embodiments, $0.001 \leq x \leq 0.05$. In some embodiments, $0.01 \leq x \leq 0.05$. In some embodiments, x is 0.03.

In some embodiments, M' is selected from the group comprising $Ti^{4+}$, $Zr^{4+}$, $Hf^{4+}$, $Ge^{4+}$, and combinations thereof. In some embodiments, M' is $Zr^{4+}$. In some embodiments, $0.0005 \leq y \leq 0.002$.

In some embodiments, the scintillator material is selected from the group comprising $SrI_2$:Eu 3%, Zr 0.05%; $SrI_2$:Eu 3%, Zr 0.1%; and $SrI_2$:Eu 3%, Zr 0.2%.

In some embodiments, the presently disclosed subject matter provides a radiation detector comprising a photon detector and a scintillation material, wherein the scintillation material comprises a scintillator material comprising one of Formulas (I) or (II):

$$(A_{1-x-y}M_xM'_y)X \qquad (I); \text{ or}$$

$$(A'_{1-x-y}M_xM'_y)X_2 \qquad (II);$$

wherein: $0.0001 \leq x \leq 0.1$; $0.0001 \leq y \leq 0.005$; A is one or more alkali metal; A' is one or more alkaline earth metal; M is a dopant ion selected from the group comprising In, Tl, Ce, Pr, Nd, Sm, Eu, Gd, Tb, Yb, Bi, Sb, and combinations thereof; M' is a tetravalent codopant ion or a combination of tetravalent codopant ions; and X is one or more halogen. In some embodiments, the detector is a medical diagnostic device, a device for oil exploration, or a device for container or baggage scanning.

In some embodiments, the presently disclosed subject matter provides a method of detecting gamma rays, X-rays, cosmic rays, and/or particles having an energy of 1 keV or greater, the method comprising using a radiation detector comprising a photon detector and a scintillation material, wherein the scintillation material comprises a scintillator material comprising one of Formulas (I) or (II):

(I); or

(II);

wherein: $0.0001 \leq x \leq 0.1$; $0.0001 \leq y \leq 0.005$; A is one or more alkali metal; A' is one or more alkaline earth metal; M is a dopant ion selected from the group comprising In, Tl, Ce, Pr, Nd, Sm, Eu, Gd, Tb, Yb, Bi, Sb, and combinations thereof; M' is a tetravalent codopant ion or a combination of tetravalent codopant ions; and X is one or more halogen.

In some embodiments, the presently disclosed subject matter provides a method of altering the optical and/or scintillation properties of an alkali halide or alkaline earth halide scintillator material, wherein the method comprises codoping the scintillator material with a tetravalent ion at a molar ratio of up to about 5000 parts-per-million (ppm) with respect to all cations. In some embodiments, the tetravalent ion is selected from the group comprising $Ti^{4+}$, $Zr^{4+}$, $Hf^{4+}$, $Ge^{4+}$, and combinations thereof. In some embodiments, the codoping alters one or more optical and/or scintillation property selected from the group comprising energy resolution, photoluminescence decay time, scintillation decay time, and light yield.

Accordingly, it is an object of the presently disclosed subject matter to provide alkali and alkaline earth halide scintillator materials and radiation detectors comprising alkali and alkaline earth halide scintillator materials; methods of detecting gamma rays, X-rays, cosmic rays and/or particles having an energy of 1 keV or greater with the radiation detectors; and methods of altering one or more optical and/or scintillation property of the scintillator materials.

An object of the presently disclosed subject matter having been stated hereinabove, and which is achieved in whole or in part by the presently disclosed subject matter, other objects will become evident as the description proceeds herein below.

DETAILED DESCRIPTION

Figure 1:
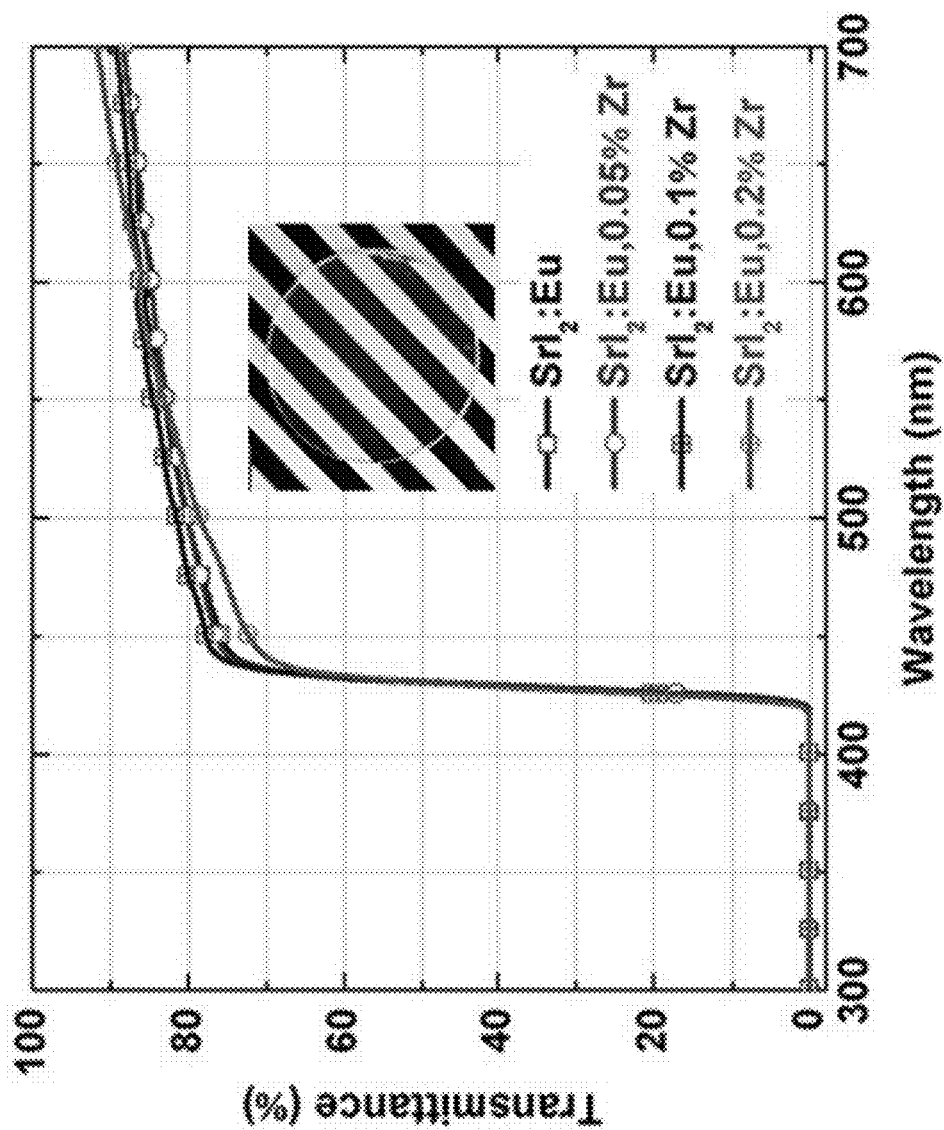
FIG. 1 is a graph of the optical transmission spectra (transmittance (in percent (%)) versus wavelength (in nanometers (nm)) of crystal slabs of non-codoped and zirconium (Zr)-codoped strontium iodide ($SrI_2$) doped with 3 atomic percent (at %) europium (Eu). The spectrum of a non-codoped crystal is shown by the line with unfilled squares ($SrI_2$:Eu). The spectrum of a crystal codoped with 0.05 at % Zr is shown by the line with unfilled circles ($SrI_2$:Eu, 0.05% Zr). The spectrum of a crystal codoped with 0.1 at % Zr is shown by the line with striped squares ($SrI_2$:Eu, 0.1% Zr). The spectrum of a crystal co-doped with 0.2 at % Zr is shown by the line with striped circles ($SrI_2$:Eu, 0.2% Zr). The inset shows a photographic image of an exemplary codoped crystal slab positioned on a striped background.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, temperature, light output, energy resolution, atomic or mole percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

Numerical ranges recited herein by endpoints include all numbers and fractions subsumed within that range (e.g. 1 to 5 includes 1, 1.5, 2, 2.75, 3, 3.90, 4, 4.24, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4).

In some embodiments, the compositional formula expression of a scintillator material can contain a colon ":", wherein the composition of the main scintillation material is indicated on the left side of the colon, and the activator or dopant ion is indicated on the right side of the colon. The atomic percentage of the dopant or activator ion can also be indicated to the right side of the colon. For the presently disclosed scintillators that comprise an alkali metal or an alkali earth metal, the atomic percentage of a dopant ion (e.g., a divalent europium ion) can be expressed in atomic percentage relative to the total amount of dopant and alkali metal or the total amount of the dopant and alkaline earth metal. Thus, the dopant ion can be an ion that substitutes for a percentage of the alkali metal ion or the alkaline earth metal ion in the base (i.e., main or un-doped) alkali halide or alkaline earth halide composition. For example, $SrI_2$:Eu 3% represents a $SrI_2$ scintillator material activated by europium, wherein 3 atomic % of the strontium is replaced by europium.

The term "high energy radiation" can refer to electromagnetic radiation having energy higher than that of ultraviolet radiation, including, but not limited to X radiation (i.e., X-ray radiation), alpha ($\alpha$) particles, gamma ($\gamma$) radiation, and beta ($\beta$) radiation. In some embodiments, the high energy radiation refers to gamma rays, cosmic rays, X-rays, and/or particles having an energy of 1 keV or greater. Scintillator materials as described herein can be used as components of radiation detectors in apparatuses such as counters, image intensifiers, and computed tomography (CT) scanners.

The term "scintillator" refers to a material that emits light (e.g., visible light) in response to stimulation by high energy radiation (e.g., X, $\alpha$, $\beta$, or $\gamma$ radiation).

"Optical coupling" as used herein refers to a physical coupling between a scintillator and a photosensor, e.g., via the presence of optical grease or another optical coupling compound (or index matching compound) that bridges the gap between the scintillator and the photosensor. In addition to optical grease, optical coupling compounds can include, for example, liquids, oils and gels.

"Light output" or "light yield" can refer to the number of light photons produced per unit energy deposited, e.g., by a gamma ray being detected, typically the number of light photons/MeV.

As used herein, chemical ions are typically represented simply by their chemical element symbols alone (e.g., Eu for europium ion(s) (e.g., $Eu^{2+}$) or Na for sodium ion(s) (e.g., $Na^+$)). Similarly, the terms "alkali" "alkali metal", "alkaline earth", and "alkaline earth metal" as used herein in reference to an alkali or alkaline earth halide are used herein to refer to an alkali metal ion or ions and an alkaline earth metal ion or ions, respectively.

II. General Considerations

One desirable characteristic of gamma-ray spectroscopic systems for nuclear security is unambiguous radioisotope identification ability. This ability can correspond to the energy resolution of the detection materials.

One strategy to provide improved systems involves optimizing existing scintillator materials. However, progress made on improvement in gamma-ray energy resolution is limited to a few compounds, such as $LaBr_3$:Ce (see Alekhin et al., Appl. Phys. Lett., 102, 161915 (2013)); $CeBr_3$ (see Quarati et al., Nucl. Instrum. Methods Phys. Res. A, 735, 655 (2104)); NaI:Tl (see Yanq and Menge, J. Appl. Phys., 118, 213106 (2015)); and $KCaI_3$:Eu. See Wu et al., Phys. Status Solidi RRL 12, 1700403 (2018). For example, the energy resolutions at 662 keV of $LaBr_3$:Ce and $CeBr_3$ were improved to 2% and 3% at 662 keV, respectively, by $Sr^{2+}$ codoping. See Alekhin et al., Appl. Phys. Lett., 102, 161915 (2013); and Quarati et al., Nucl. Instrum. Methods Phys. Res. A, 735, 655 (2104). In the case of NaI:Tl, a long-standing workhorse scintillator, energy resolution can be improved by $Sr^{2+}$ or $Ca^{2+}$ codoping due to the suppression of slow scintillation processes. See Yanq and Menqe, J. Appl. Phys., 118, 213106 (2015). However, attempts to optimize the energy resolution of another cutting-edge scintillator, $SrI_2$:$Eu^{2+}$, an exemplary alkaline earth halide scintillator, using monovalent (i.e., $Cs^+$, $Na^+$, and $Cu^+$) divalent ($Mg^{2+}$, $Ba^{2+}$, $Ca^{2+}$, $Fe^{2+}$, and $Sn^{2+}$), and even trivalent ($La^{3+}$, $Gd^{3+}$, and $Lu^{3+}$) ions have been unsuccessful. See Lam et al., IEEE Trans. Nucl. Sci., 62, 3397 (2015); and Nishimoto et al., J. Cryst. Growth, 401, 484 (2014).

The presently disclosed subject matter is based at least in part on the finding that tetravalent ion codoping can improve the energy resolution of $SrI_2$:$Eu^{2+}$. Thus, in some embodiments, the presently disclosed subject matter provides a scintillator material comprising an alkali halide or an alkaline earth halide doped with a dopant or activator ion and codoped with a tetravalent ion. For example, the codoped alkali halide and alkaline earth halide scintillators can have modified scintillation decay time, afterglow, light yield, and/or energy resolution compared to the same material without the tetravalent codopant ion. In some embodiments, the codoping comprises codoping with one type or two or more types of tetravalent ion at a molar ratio of about 5000 parts-per-million (ppm) or less with respect to all cations. In some embodiments, the dopant or activator is an ion of europium (Eu) and/or one or more other dopants (e.g., cerium (Ce), praseodymium (Pr), terbium (Tb), ytterbium (Yb), thallium (Tl), indium (In), sodium (Na), and other dopants that can luminesce in response to the absorption of energy). In some embodiments, the tetravalent ion is selected from the group comprising, but not limited to the tetravalent ion of titanium ($Ti^{4+}$), zirconium ($Zr^{4+}$), hafnium ($Hf^{4+}$), germanium ($Ge^{4+}$), and combinations thereof.

In some embodiments, the presently disclosed subject matter provides a scintillator material comprising one of Formulas (I) or (II):

$$(A_{1-x-y}M_xM'_y)X \quad (I); or$$

$$(A'_{1-x-y}M_xM'_y)X_2 \quad (II);$$

wherein: $0.0001 \leq x \leq 0.1$; $0.0001 \leq y \leq 0.005$; A is one or more alkali metal, such as lithium (Li), sodium (Na), potassium (K), rubidium (Rb), cesium (Cs), francium (Fr), and combinations thereof; A' is one or more alkaline earth metal, such as beryllium (Be), magnesium (Mg), calcium (Ca), strontium (Sr), barium (Ba), radium (Ra), and combinations thereof; M is a dopant or activator ion selected from the group comprising In, Tl, Ce, Pr, Nd, Sm, Eu, Gd, Tb, Yb, Bi, Sb, and combinations thereof; M' is a tetravalent codopant ion or a combination of tetravalent codopant ions; and X is one or more halogen (i.e., fluorine (F), chlorine (Cl), bromine (Br), and iodine (I) and combinations thereof).

Alkali metal A can be any suitable alkali metal or combination of alkali metals. In some embodiments, A is selected from the group comprising Li, Na, K, Rb, Cs, and combinations thereof.

Alkaline earth metal A' can be any suitable alkali earth metal or combination of alkaline earth metals. In some embodiments, A' is selected from the group comprising Mg, Ca, Sr, Ba, and combinations thereof. In some embodiments, A' is selected from Sr and Ba. In some embodiments, A' is Sr.

Halogen X can be any suitable halogen or combination of halogens, e.g., I, F, Br, and Cl. In some embodiments, X is selected from Cl, Br, I and combinations thereof. In some embodiments, X is I.

In some embodiments, dopant or activator M is Eu, Ce, or Pr. In some embodiments, M is Eu (which can be present as $Eu^{2+}$).

In some embodiments, the scintillator material comprises between about 0.1 at % and about 5 at % of the dopant or activator (i.e., M) compared to all the cations in the material. Thus, in some embodiments, $0.001 \leq x \leq 0.05$. For the presently disclosed scintillator materials, the at % and the mole percent (mol %) is the same. Thus, in some embodiments, the scintillator material comprises between about 0.1 mol % and about 5 mol % of the dopant or activator. In some embodiments, 0.01≤x≤0.05. Thus, in some embodiments, the scintillator material comprises about 1.0, 1.5, 2.0, 2.5, 3.0, 3.5, 4.0, 4.5, or about 5.0 at % (or mol %) of the dopant or activator. In some embodiments, x is 0.03 and the scintillator material comprises about 3.0 at % (or 3 mol %) of the dopant.

In some embodiments, M' is selected from the group comprising $Ti^{4+}$, $Zr^{4+}$, $Hf^{4+}$, $Ge^{4+}$, and combinations thereof. In some embodiments, M' is $Zr^{4+}$.

In some embodiments, the scintillator material comprises between about 0.05 at % (or mol %) and about 0.2 at % (or mol %) of the codopant compared to all of the cations present in the material. Thus, in some embodiments, 0.0005≤y≤0.002. In some embodiments, y is about 0.0005, about 0.001, or about 0.002.

In some embodiments, the scintillator material comprises $SrI_2$ doped with one or more activator or dopant M and codoped with a tetravalent ion. In some embodiments, the scintillator material comprises $SrI_2$:Eu codoped with a tetravalent ion. In some embodiments, the scintillator material comprises $SrI_2$:Eu codoped with $Zr^{4+}$ (i.e., $SrI_2$:Eu, Zr or $SrI_2$:$Eu^{2+}$, $Zr^{4+}$). In some embodiments, the scintillator material is selected from the group comprising $SrI_2$:Eu 3%, Zr 0.05%; $SrI_2$:Eu 3%, Zr 0.1%; and $SrI_2$:Eu 3%, Zr 0.2%.

In some embodiments, the scintillation material can be a single crystal, a polycrystalline material, and/or a ceramic. By "single crystal" is meant a material manufactured by a liquid phase method having few or no grain boundaries and wherein each adjoining crystal grain generally has the same orientation. In some embodiments, the material can be polycrystalline and/or ceramic and contain crystals of varying size and/or orientation.

II. Radiation Detectors, Related Devices and Methods

In some embodiments, the presently disclosed subject matter provides a radiation detector comprising a scintillator material as described hereinabove or a mixture of such materials. The radiation detector can comprise a scintillator (which absorbs radiation and emits light) and a photodetector (which detects said emitted light). The photodetector can be any suitable detector or detectors and can be or not be optically coupled to the scintillator material for producing an electrical signal in response to emission of light from the scintillator material. Thus, the photodetector can be configured to convert photons to an electrical signal. For example, a signal amplifier can be provided to convert an output signal from a photodiode into a voltage signal. The signal amplifier can also be designed to amplify the voltage signal. Electronics associated with the photodetector can be used to shape and digitize the electronic signal.

Figure 7:
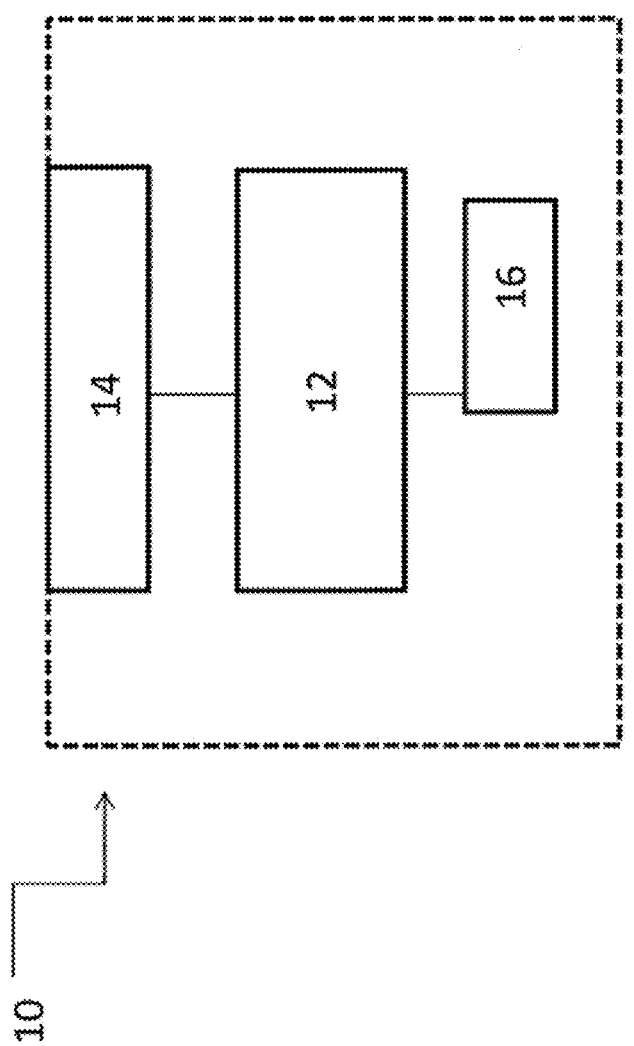
FIG. 7 is a schematic drawing of an apparatus for detecting radiation according to the presently disclosed subject matter. Apparatus 10 includes photon detector 12 optically coupled to scintillator material 14. Apparatus 10 can optionally include electronics 16 for recording and/or displaying electronic signal from photon detector 12. Thus, optional electronics 16 can be in electronic communication with photon detector 12.

Referring now to FIG. 7, in some embodiments, the presently disclosed subject matter provides an apparatus 10 for detecting radiation wherein the apparatus comprises a photon detector 12 and a scintillator material 14 (e.g., a europium-containing ternary metal halide). Scintillator material 14 can convert radiation to light that can be collected by a charge-coupled device (CCD) or a photomultiplier tube (PMT) or other photon detector 12 efficiently and at a fast rate.

Referring again to FIG. 7, photon detector 12 can be any suitable detector or detectors and can be optically coupled (e.g., via optical grease or another optical coupling compound, such as an optical coupling oil or liquid) to the scintillator (e.g., the tetravalent ion-codoped, europium-containing alkaline earth metal halide) for producing an electrical signal in response to emission of light from the scintillator. Thus, photon detector 12 can be configured to convert photons to an electrical signal. Electronics associated with photon detector 12 can be used to shape and digitize the electronic signal. Suitable photon detectors 12 include, but are not limited to, photomultiplier tubes, photodiodes, CCD sensors, and image intensifiers. Apparatus 10 can also include electronics 16 for recording and/or displaying the electronic signal.

In some embodiments, the radiation detector is configured for use as part of a medical or veterinary diagnostic device, a device for oil or other geological exploration (e.g., oil well logging probes), or as a device for security and/or military-related purposes (e.g., as a device for container, vehicle, or baggage scanning or for scanning humans or other animals). In some embodiments, the medical or veterinary diagnostic device is selected from, but not limited to, a positron emission tomography (PET) device, an X-ray computed tomography (CT) device, a single photon emission computed tomography (SPECT) device, or a planar nuclear medical imaging device. For example, the radiation detector can be configured to move (e.g., via mechanical and/or electronic controls) over and/or around a sample, such as a human or animal subject, such that it can detect radiation emitted from any desired site or sites on the sample. In some embodiments, the detector can be set or mounted on a rotating body to rotate the detector around a sample.

In some embodiments, the device can also include a radiation source. For instance, an X-ray CT device of the presently disclosed subject matter can include an X-ray source for radiating X-rays and a detector for detecting said X-rays. In some embodiments, the device can comprise a plurality of radiation detectors. The plurality of radiation detectors can be arranged, for example, in a cylindrical or other desired shape, for detecting radiation emitted from various positions on the surface of a sample.

In some embodiments, the presently disclosed subject matter provides a method for detecting radiation (or the absence of radiation) using a radiation detector comprising a tetravalent ion-codoped alkali or alkaline earth halide scintillator as described hereinabove. Thus, in some embodiments, the presently disclosed subject matter provides a method of detecting gamma rays, X-rays, cosmic rays and particles having an energy of 1 keV or greater, wherein the method comprises using a radiation detector comprising a scintillator material of one of Formulas (I) or (II) or a mixture of such materials.

In some embodiments, the method can comprise providing a radiation detector comprising a photodetector and a scintillator material of the presently disclosed subject matter; positioning the detector, wherein the positioning comprises placing the detector in a location wherein the scintillator material is in the path of a beam of radiation (or the suspected path of a beam of radiation); and detecting light (or detecting the absence of light) emitted by the scintillator material with the photodetector. Detecting the light emitted by the scintillator material can comprise converting photons to an electrical signal. Detecting can also comprise processing the electrical signal to shape, digitize, or amplify the signal. The method can further comprise displaying the electrical signal or processed electrical signal.

In some embodiments, the presently disclosed subject matter provides a radiation detector comprising a photon detector and a scintillator material of Formula (I) or (II):

$$(A_{1-x-y}M_xM'_y)X \quad \text{(I); or}$$

$$(A'_{1-x-y}M_xM'_y)X_2 \quad \text{(II);}$$

wherein: $0.0001 \leq x \leq 0.1$; $0.0001 \leq y \leq 0.005$; A is one or more alkali metal; A' is one or more alkaline earth metal; M is an activator or dopant ion selected from the group comprising In, Tl, Ce, Pr, Nd, Sm, Eu, Gd, Tb, Yb, Bi, Sb, and combinations thereof; M' is a tetravalent codopant ion or a combination of tetravalent codopant ions; and X is one or more halogen. In some embodiments, A is selected from the group comprising Li, Na, K, Rb, Cs, and combinations thereof. In some embodiments, A' is selected from the group comprising Mg, Ca, Sr, Ba, and combinations thereof. In some embodiments, A' is selected from Sr and Ba. In some embodiments, A' is Sr. In some embodiments, X is selected from Cl, Br, I and combinations thereof. In some embodiments, X is I.

In some embodiments, dopant or activator M is Eu, Ce, or Pr. In some embodiments, M is Eu (which can be present as $Eu^{2+}$). In some embodiments, the scintillator material comprises between about 0.1 at % (or mol %) and about 5 at % (or mol %) of the dopant or activator (i.e., M) compared to all the cations in the scintillator material. Thus, in some embodiments, $0.001 \leq x \leq 0.05$. In some embodiments, $0.01 \leq x \leq 0.05$. Thus, in some embodiments, the scintillator material comprises about 1.0, 1.5, 2.0, 2.5, 3.0, 3.5, 4.0, 4.5, or about 5.0 at % (or mol %) of the dopant or activator. In some embodiments, x is 0.03 and the scintillator material comprises about 3.0 at % (or mol %) of the dopant.

In some embodiments, M' is selected from the group comprising $Ti^{4+}$, $Zr^{4+}$, $Hf^{4+}$, $Ge^{4+}$, and combinations thereof. In some embodiments, M' is $Zr^{4+}$. In some embodiments, the scintillator material comprises between about 0.05 at % (or mol %) and about 0.2 at % (or mol %) of the codopant compared to all of the cations present in the scintillator material. Thus, in some embodiments, $0.0005 \leq y \leq 0.002$. In some embodiments, y is about 0.0005, about 0.001, or about 0.002.

In some embodiments, the scintillator material comprises $SrI_2$ doped with one or more activator or dopant M and codoped with a tetravalent ion. In some embodiments, the scintillator material comprises $SrI_2$:Eu codoped with a tetravalent ion. In some embodiments, the scintillator material comprises $SrI_2$:Eu codoped with $Zr^{4+}$ (i.e., $SrI_2$:Eu, Zr or $SrI_2$:$Eu^{2+}$, $Zr^{4+}$). In some embodiments, the scintillator material is selected from the group comprising $SrI_2$:Eu 3%, Zr 0.05%; $SrI_2$:Eu 3%, Zr 0.1%; and $SrI_2$:Eu 3%, Zr 0.2%.

IV. Methods of Preparation of Scintillation Materials

The presently disclosed scintillation materials can be prepared via any suitable method. Typically, the appropriate reactants (e.g., metal halides, such as, but not limited to CsBr, NaBr, CsI, NaI, $SrI_2$, $BaI_2$, $EuBr_2$, $ZrI_4$, and the like) are melted at a temperature sufficient to form a congruent, molten composition. The melting temperature can depend on the identity of the reactants themselves (e.g., on the melting points of the individual reactants), but is usually in the range of from about 300° C. to about 1350° C. Exemplary techniques for preparing the materials include, but are not limited to, the Bridgman or Bridgman-Stockbarger method, the Czochralski method, the zone-melting method (or "floating zone" method), the vertical gradient freeze (VGF) method, and temperature gradient methods.

For instance, in some embodiments, high purity reactants can be mixed and melted to synthesize a compound of the desired composition. A single crystal or polycrystalline material can be grown from the synthesized compound by the Bridgman method, in which a sealed ampoule containing the synthesized compound is transported from a hot zone to a cold zone through a controlled temperature gradient at a controlled speed. In some embodiments, high purity reactants can be mixed in stoichiometric ratios depending upon the desired composition of the scintillator material and loaded into an ampoule, which is then sealed. After sealing, the ampoule is heated and then cooled at a controlled speed.

In some embodiments, the presently disclosed subject matter provides a method of preparing a scintillation material comprising an europium- and/or other dopant-containing, tetravalent ion-codoped alkali or alkaline earth halide, such as a material of one of Formulas (I) or (II) described hereinabove. In some embodiments, the method comprises heating a mixture of raw materials (e.g., a mixture of metal halides in a stoichiometric ratio depending upon the formula of the desired scintillation material) above their respective melting temperatures (i.e., above the melting temperature of the raw material with the highest melting temperature). In some embodiments, the raw materials are dried prior to, during, or after mixing. In some embodiments, the raw materials are mixed under low humidity and/or low oxygen conditions. In some embodiments, the raw materials are mixed in a dry box and/or under conditions of less than about 0.1 parts-per-million (ppm) moisture and/or oxygen (e.g., less than about 0.1 ppm, 0.09 ppm, 0.08 ppm, 0.07 ppm, 0.06 ppm, 0.05 ppm, 0.04 ppm, 0.03 ppm, 0.02 ppm, or less than 0.01 ppm moisture and/or oxygen).

The mixture of raw materials can be sealed in a container (e.g., a quartz ampoule) that can withstand the subsequent heating of the mixture and which is chemically inert to the mixture of raw materials. The mixture can be heated at a predetermined rate to a temperature above the melting temperature of the individual raw materials. In some embodiments, the mixture can be heated to a temperature that is between about 10° C. and about 40° C. (e.g., about 10, 12, 14, 16, 18, 20, 22, 24, 26, 28, 30, 32, 34, 36, 38, or about 40° C.) above the melting temperature of the raw material with the highest melting temperature. In some embodiments, the mixture is heated to about 20° C. above the melting temperature of the raw material with the highest melting temperature. This temperature can be maintained for a period of time, such as between about 2 and about 12 hours (e.g., about 2, 3, 4, 5, 6, 7, 8, 9, 10, 11, or about 12 hours). Then the mixture can be cooled at a predetermined rate until the mixture reaches about room temperature (e.g., between about 20° C. and about 25° C.). If desired, the sealed container can be rotated or inverted. Then the heating and cooling can be repeated, e.g., to provide further mixing of all of the components in the mixture. The rotating or inverting and heating/cooling steps can be repeated one or more additional times, as desired.

Accordingly, in some embodiments, the method comprises:

(a) providing a mixture of raw materials, wherein the raw materials are provided in a stoichiometric ratio according to one of Formulas (I) and (II);

(b) sealing said mixture in a sealed container;

(c) heating the mixture to about 20° C. above the melting point of the raw material having the highest melting point for a period of time;

(d) cooling the mixture to about room temperature; and
(e) optionally repeating steps (c) and (d).

In some embodiments, steps (c) and (d) are repeated one or more times.

In some embodiments, the method further comprises annealing the tetravalent ion-codoped alkali or alkaline earth halide scintillator material. The annealing can be performed, for example, in air, nitrogen, or a mixture of nitrogen and hydrogen. The annealing can be done at any suitable temperature, e.g., between about 800 and about 1600 degrees Celsius (e.g., about 800, 900, 1000, 1100, 1200, 1300, 1400, 1500, and about 1600 degrees Celsius).

In some embodiments, the scintillation materials can be provided as single crystals, as a polycrystalline material, and/or as a ceramic material. In some embodiments, the material is provided as a polycrystalline material. The polycrystalline material can have analogous physical, optical and scintillation properties as a single crystal otherwise having the same chemical composition.

V. Methods of Altering Optical and/or Scintillation Properties

In some embodiments, the presently disclosed subject matter provides a method of altering one or more optical and/or scintillation properties of an alkali or alkaline earth halide scintillator, e.g., to provide a scintillator material with properties tailored for a particular application, such as for a particular medical diagnostic application or a particular security/military-related application. In some embodiments, the presently disclosed subject matter provides a method of altering one or more optical and/or scintillation properties of an alkali or alkaline earth halide scintillation material, wherein the optical and/or scintillation properties being altered are selected from the group including, but not limited to, scintillation light yield, decay time (i.e., photoluminescence and/or scintillation decay time), afterglow, rise time, energy resolution, proportionality, and sensitivity to light exposure. In some embodiments, the method comprises preparing the scintillation material in the presence of a dopant ion and one or more tetravalent codopant ions. In some embodiments, the method comprises preparing the scintillation material in the presence of a dopant ion (e.g., In, Tl, Ce, Pr, Nd, Sm, Eu, Gd, Tb, Yb, Bi, and Sb) and in the presence of a tetravalent codopant ion, wherein the tetravalent codopant ion is present at a molar ratio of up to about 5000 ppm with respect to all cations. In some embodiments, the dopant ion is present at a mol percent of about 10 mol % or less compared to all cations.

In some embodiments, the alkali or alkaline earth scintillation material whose optical and/or scintillation properties are being altered via tetravalent ion codoping is a scintillator material of Formula (I') or (II'):

    (I'); or

    (II);

wherein: $0.0001 \leq x \leq 0.1$; A is one or more alkali metal; A' is one or more alkaline earth metal; M is selected from the group comprising In, Tl, Ce, Pr, Nd, Sm, Eu, Gd, Tb, Yb, Bi, Sb, and combinations thereof; and X is one or more halogen. In some embodiments, A is selected from the group comprising Li, Na, K, Rb, Cs, and combinations thereof. In some embodiments, A' is selected from the group comprising Mg, Ca, Sr, Ba, and combinations thereof. In some embodiments, A' is selected from Sr and Ba. In some embodiments, A' is Sr. In some embodiments, X is selected from Cl, Br, I and combinations thereof. In some embodiments, X is I.

In some embodiments, dopant or activator M is Eu, Ce, or Pr. In some embodiments, M is Eu (which can be present as $Eu^{2+}$). In some embodiments, the scintillator material is $SrI_2$:Eu.

In some embodiments, the scintillator material comprises between about 0.1 at % (or mol %) and about 5 at % (or mol %) of the dopant or activator (i.e., M) compared to all the cations in the scintillator material. Thus, in some embodiments, $0.001 \leq x \leq 0.05$. In some embodiments, $0.01 \leq x \leq 0.05$. Thus, in some embodiments, the scintillator material comprises about 1.0, 1.5, 2.0, 2.5, 3.0, 3.5, 4.0, 4.5, or about 5.0 at % (or mol %) of the dopant or activator. In some embodiments, x is 0.03 and the scintillator material comprises about 3.0 at % (or mol %) of the dopant.

In some embodiments, the tetravalent ion (i.e., the codopant) is selected from the group consisting of $Ti^{4+}$, $Zr^{4+}$, $Hf^{4+}$, $Ge^{4+}$, and combinations thereof. In some embodiments, the tetravalent ion is $Zr^{4+}$. In some embodiments, the scintillator material is codoped with between about 0.01 at % (or mol %) and about 0.5 at % (or mol %) of the codopant compared to all of the cations present in the material. In some embodiments, the scintillator material is codoped with between about 0.05 at % (or mol %) and about 0.2 at % (or mol %) (e.g., about 0.05, 0.06, 0.07, 0.08, 0.09, 0.10, 0.11, 0.12, 0.13, 0.14, 0.15, 0.16, 0.17, 0.18, 0.19. or about 0.20 at % (or mol %)) of the codopant compared to all of the cations present in the material.

In some embodiments, the codoping alters one or more property of the group comprising energy resolution, photoluminescence decay time, scintillation decay time, and light yield. In some embodiments, the codoping improves energy resolution (i.e., provides a smaller energy resolution percent). In some embodiments, the codoping increases light yield.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Preparation of Scintillator Materials

The mini-ampoule Bridgeman technique (see Lindsey et al., J. Cryst. Growth 470, 20 (2017)) was used to grow noncodoped $SrI_2$:$Eu^{2+}$3% and 0.05%, 0.1%, and 0.2% $Zr^{4+}$ codoped $SrI_2$:$Eu^{2+}$3% single crystals. The codopant concentrations given refer to the initial starting melt, and calculations are based on the assumption that the $Zr^{4+}$ substituted for $Sr^{2+}$.

Briefly, high purity anhydrous $SrI_2$ and $EuI_2$ beads (99.999%) and $ZrI_4$ (99.95%) from APL Engineered Materials Inc. (Urbana, Ill., United States of America) were used. These beads were loaded and mixed in quartz ampoules according to the particular composition. The loaded ampoule was evacuated to $10^{-6}$ torr and heated to 100° C. and kept for 12 hours at this temperature to removed residual water and oxygen impurities. After baking, the ampoule was sealed and transferred to a Bridgman growth furnace. A temperature gradient of about 25° C./cm and a translation rate of 1 mm/h were used. The 025 mm grown crystals were cooled to room temperature at a speed of 10° C./hour. The grown crystals were taken out from the ampoules, cut and polished in a glovebox with $H_2O$ level of <0.1 ppm and $O_2$ level of <0.1 ppm. The as grown crystals were transparent and inclusion-free. For optical and scintillation measurements, each crystal sample was loaded into a housing filled with mineral oil to protect the sample from degradation. The housing was made of a quartz tube and a borosilicate glass as an optical window. The sample handling process was conducted in a glovebox with $H_2O$ level of <0.1 pp, and $O_2$ level of <0.1 ppm. The materials had a similar hydroscopicity and melting point to $KCaI_3$. For example, the melting point of $SrI_2$ is 538° C. and the melting point of $KCaI_3$ is 540° C.

Example 2

Optical Property Measurements

Optical absorption spectra were measured with a Varian Cary 5000 UV-Vis-NIR spectrophotometer (Varian Inc., Palo Alto, Calif., United States of America) in the 300-700 nm range. Photoluminescence (PL) decay was measured on the HORIBA™ Jobin Yvon Fluorolog-3 spectrofluorometer (HORIBA Ltd., Kyoto, Japan) using a time-correlated-single-photon counting module. Pulsed light-emitting diodes (HORIBA™ Jobin Yvon NanoLEDs, HORIBA Ltd., Kyoto, Japan) were used as the excitation source. The duration of the light pulse was shorter than 2 ns. The PL excitation and emission spectra were also measured with the HORIBA™ Jobin Yvon Fluorolog-3 spectrofluorometer (HORIBA Ltd., Kyoto, Japan). A 450 W continuous xenon lamp was used as the excitation source.

The as-grown boules were transparent and crack- and inclusion-free. For each composition, the optical quality of a 1 mm thick sample was evaluated using optical transmission spectra. Because of the $4f$-$5d_1$ absorption band for the $Eu^{2+}$ activators, the absorbance increases abruptly below 425 nm. See FIG. 1. All samples have 70% or greater transmittance between 450 nm and 700 nm, indicating high optical quality of the synthesized crystals.

Example 3

Scintillation Property Measurements

An X-ray tube operated at 35 kV and 0.1 mA was used as an excitation source for X-ray excited radioluminescence (RL) measurements. Scintillation decay times were acquired with an Agilent DSO6104A digital oscilloscope (Agilent Technologies, Santa Clara, Calif., United States of America) in a single shot mode under $^{137}Cs$ source irradiation.

Absolute light yield measurements were recorded by using a pulse processing chain including a Hamamatsu bialkali R2059 photomultiplier tube (PMT, Hamamastu Photonics, K.K., Hamamatsu City, Japan), an Ortec 672 amplifier (Advanced Measurement Technology, Inc., Oak Ridge, Tenn., United States of America), a Canberra model 2005 pre-amplifier (Canberra Industries, Ind., Meridan, Conn., United States of America), and a Tukan 8k mutlichannel analyzer (MCA, National Center for Nuclear Research, Swierk, Poland). Each sample was directly coupled to the PMT using mineral oil. A SPECTRALON™ (Labsphere, Inc., North Sutton, N.H., United States of America) dome-shaped reflector with a 50 mm radius was used to maximize the collection of light. The photoelectron yields were estimated by using the single photoelectron peak method. Measurements on the samples were made with 10 microsecond (pis) shaping time for current pulse integration. Each sample was measured under irradiation with a 15 μCi $^{137}Cs$ source. The reproducibility of the light yield (LY) measurements was ±5%.

The energy resolution was measured by using a 2-inch diameter high quantum efficiency Hamamatsu R6231-100 PMT (Hamamatsu Photonics, Hamamatsu City, Japan). This PMT was operated at −1000 VBias. $^{137}Cs$ (662 keV) and $^{57}Co$ (122 keV) γ-ray sources were used to irradiate the crystals. The energy resolution (ER) was calculated as the full width at half maximum (FWHM) divided by the photopeak centroid. Nonproportionality (nPr) was also evaluated with the same set up. Discrete $^{133}Ba$ (31 and 356 keV), $^{241}Am$ (59.5 keV), $^{57}Co$ (122 keV), $^{22}Na$ (511 keV), and $^{137}Cs$ (662 keV) X- and γ-ray sources were used to excite the crystals at energies from 31 to 662 keV.

Figure 2:
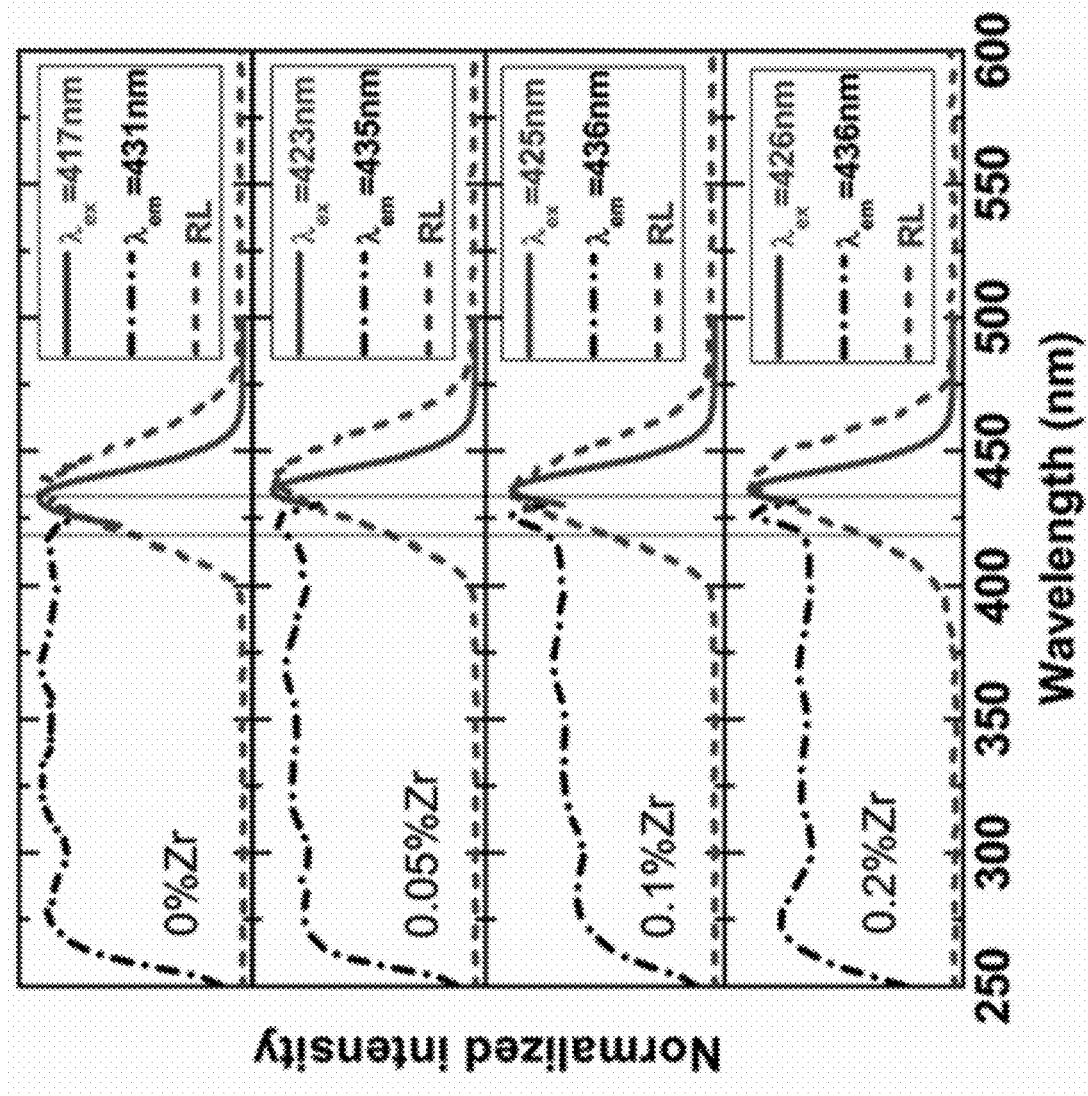
FIG. 2 is a series of graphs of the photoluminescence emission and excitation spectra and the X-ray excited radioluminescence (RL) spectra of strontium iodide ($SrI_2$) doped with 3 atomic percent (at %) europium (Eu) and codoped with different amounts of zirconium (Zr). The spectra show normalized intensity versus wavelength (in nanometers (nm)). The photoluminescence excitation spectra (solid lines) were measured at an excitation wavelength (Xex) of between 417 nm and 426 nm. The photoluminescence emission spectra (dashed and dotted lines) are measured at an emission wavelength (Xem) between 431 nm and 436 nm. The RL spectra are shown in dashed lines. From top to bottom, the spectra are those of non-codoped Eu-doped $SrI_2$ (0% Zr); Eu-doped $SrI_2$ codoped with 0.05 at % Zr (0.05% Zr), Eu-doped $SrI_2$ codoped with 0.1 at % Zr (0.1% Zr); and Eu-doped $SrI_2$ codoped with 0.2 at % Zr (0.2% Zr).
Figure 3A:
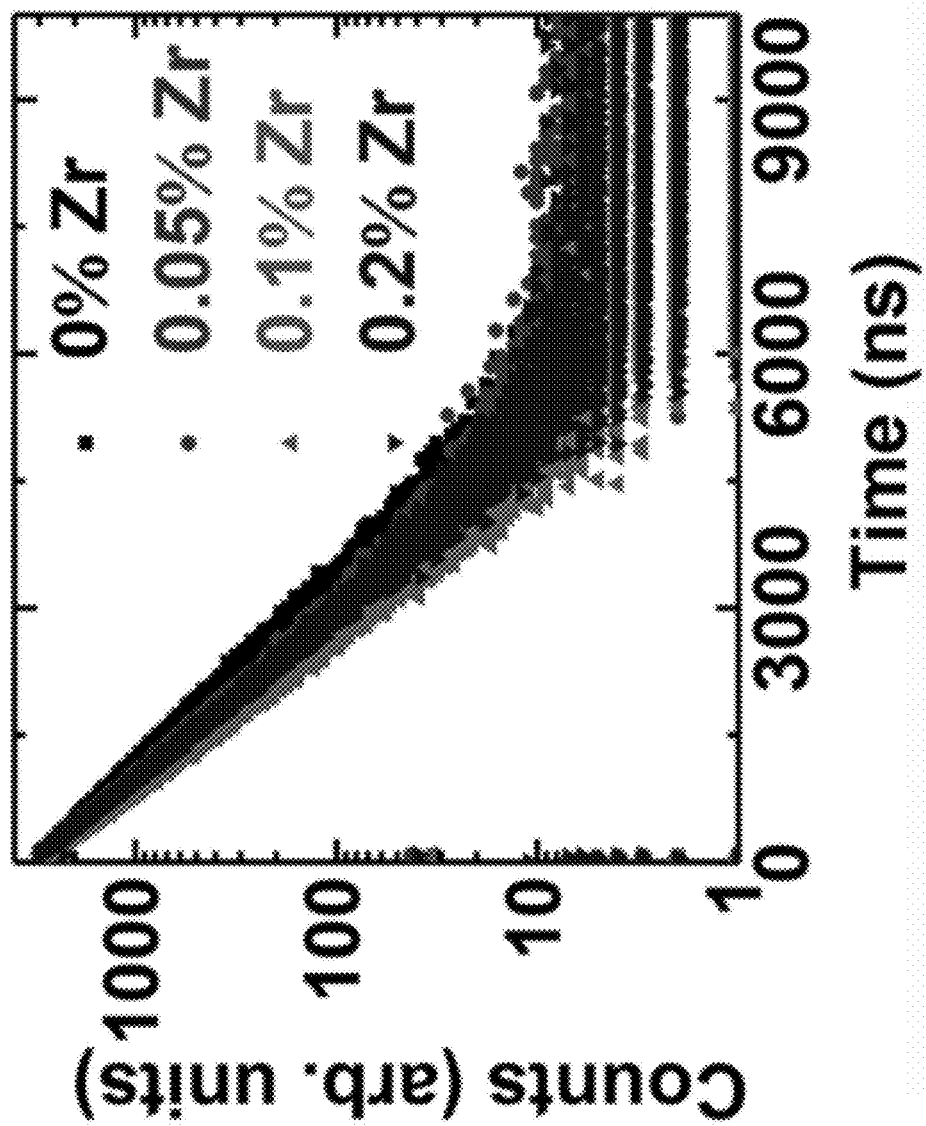
FIG. 3A is a graph of the photoluminescence (PL) decay profiles (in counts (arbitrary units (arb. units)) versus time (in nanoseconds (ns)) of strontium iodide ($SrI_2$) doped with 3 atomic percent (at %) europium (Eu) and codoped with different amounts of zirconium (Zr) monitored at an excitation wavelength ($\lambda_{ex}$) of 370 nanometers (nm) and an emission wavelength ($\lambda_{em}$) of 436 nm. Profiles are shown for non-codoped Eu-doped $SrI_2$ (0% Zr; squares), Eu-doped $SrI_2$ codoped with 0.05 at % Zr (0.05% Zr; circles), Eu-doped $SrI_2$ codoped with 0.1 at % Zr (0.1% Zr, upward pointing triangles); and Eu-doped $SrI_2$ codoped with 0.2 at % Zr (0.2% Zr, downward pointing triangles).
Figure 3B:
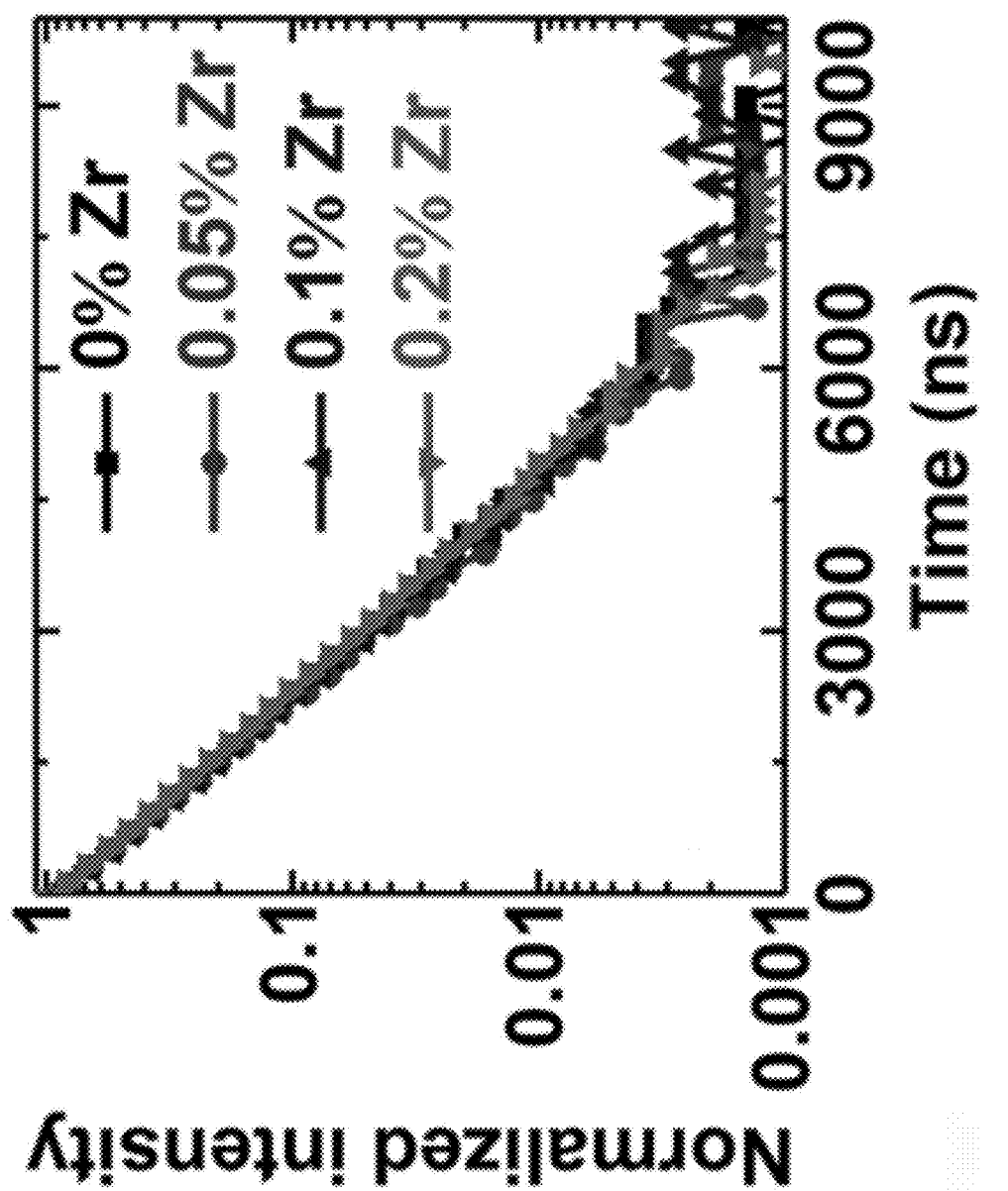
FIG. 3B is a graph of the scintillation decay profiles (in normalized intensity versus time (in nanoseconds (ns)) of strontium iodide ($SrI_2$) doped with 3 atomic percent (at %) europium (Eu) and codoped with different amounts of zirconium (Zr) under cesium-137 ($^{137}Cs$) irradiation. Profiles are shown for non-codoped Eu-doped $SrI_2$ (0% Zr; squares), Eu-doped $SrI_2$ codoped with 0.05 at % Zr (0.05% Zr; circles), Eu-doped $SrI_2$ codoped with 0.1 at % Zr (0.1% Zr, upward pointing triangles); and Eu-doped $SrI_2$ codoped with 0.2 at % Zr (0.2% Zr, downward pointing triangles).
Figure 3C:
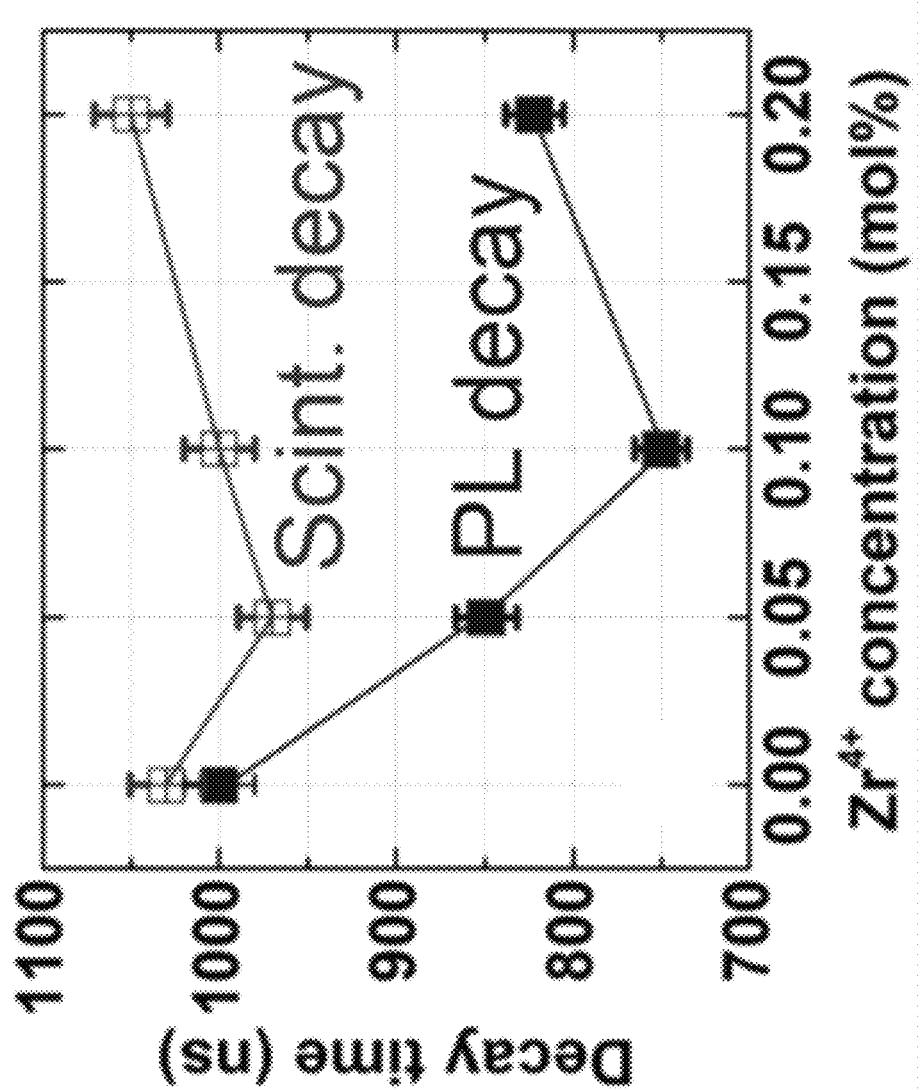
FIG. 3C is a graph showing the photoluminescence (PL) and scintillation decay time constant (in nanoseconds (ns)) of the materials described for FIGS. 3A and 3B as a function of zirconium tetravalent ion codoping concentration (mole percent (mol %)). Scintillation decay is shown using unfilled squares and PL decay in filled squares.

Results: The RL and photoluminescence excitation and emission spectra of non-codoped and codoped samples at room temperature are shown in FIG. 2. For all samples, the excitation spectrum monitored at an emission wavelength between 431 and 436 nm ($Eu^{2+}5d_1$-4f de-excitation) shows several broad bands associated with transitions from 4f ground state to the 5d excited states of $Eu^{2+}$. The $Eu^{2+}5d_1$-4f de-excitation of non-codoped $SrI_2$:$Eu^{2+}$ peaks at around 430 nm. With the increase of $Zr^{4+}$ codoping, the $Eu^{2+}5d_1$-4f emission band is slightly redshifted. The emission redshift is also observed in RL spectra. Without being bound to any one theory, the broader full width at half maximum of the emission peak in the RL spectra compared to that of PL spectra is ascribed to a reabsorption effect caused by use of in-line transmission measurement geometry instead of reflection geometry The photoluminescence and scintillation decay profiles of non-codoped and $Zr^{4+}$ codoped $SrI_2$:Eu samples were measured. The decay profiles are shown in FIGS. 3A and 3B. All the decay profiles can be fit well by a single exponential function. The PL and scintillation decay constants as a function of $Zr^{4+}$ codoping concentration are plotted in FIG. 3C. The PL and scintillation decay constants of non-codoped $SrI_2$:Eu are 1.00 μs and 1.03 μs, respectively. For the codoped samples, the PL and scintillation decay constants both tend to decrease first and then increase. As observed in FIG. 2, the Stokes shift becomes smaller with the increase of $Zr^{4+}$ concentration. This can lead to an increased self-absorption effect, which can prolong either PL or scintillation decay time. Without being bound to any one theory, the PL decay time shortening observed can relate to enhanced non-radiative transitions around $Eu^{2+}$ ions. For example, some newly formed defects induced by $Zr^{4+}$ codoping could be spatially correlated with $Eu^{2+}$ centers. Another phenomenon of note is that the difference between the PL and scintillation decay constants increases with the introduction of $Zr^{4+}$ ions. The difference approximately equals migration time of free charge carriers to activators. Delayed recombination of free charge carriers indicates the formation of shallow traps in the $Zr^{4+}$ codoped samples.

Figure 4:
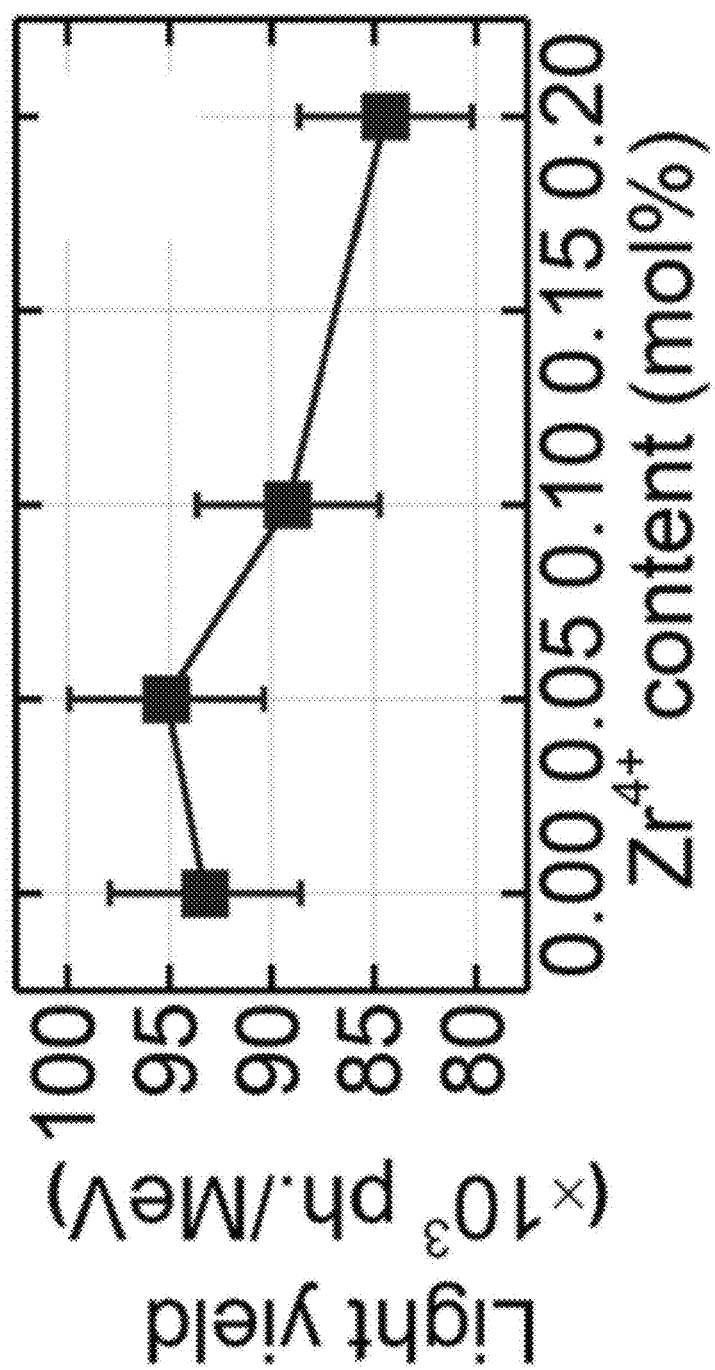
FIG. 4 is graph of the absolute light yield (LY) of strontium iodide ($SrI_2$) doped with 3 atomic percent (at %) europium (Eu) and codoped with different amounts of zirconium (Zr). LY (in thousands of photons per megaelectronvolt (MeV)) is shown as a function of codopant ion content (in mole percent (mol %), ranging from 0 mol % to 0.2 mol %).

The absolute light yields of 5 $mm^3$ non-codoped and $Zr^{4+}$ codoped $SrI_2$:Eu samples were evaluated by using the single photoelectron peak of the R2059 PMT. The wavelength-weighted quantum efficiency of the R2059 PMT is also considered for all samples. The estimated absolute light yield as a function of $Zr^{4+}$ codoping concentration is presented in FIG. 4. The light yield of non-codoped $SrI_2$:Eu is 93,000 photons/MeV, consistent with published results. See Alekhin et al., IEEE Trans. Nucl. Sci. 58, 2519 (2011); Boatner et al., J. Cryst. Growth, 329, 63 (2013); and Yokota et al., J. Cryst. Growth, 375, 49 (2013). Upon 0.05 at % $Zr^{4+}$ codoping, the light yield slightly increases to 95,000 photons/MeV. When further increasing $Zr^{4+}$ concentration, it decreases to 85,000-90,000 photons/MeV.

Figure 5A:
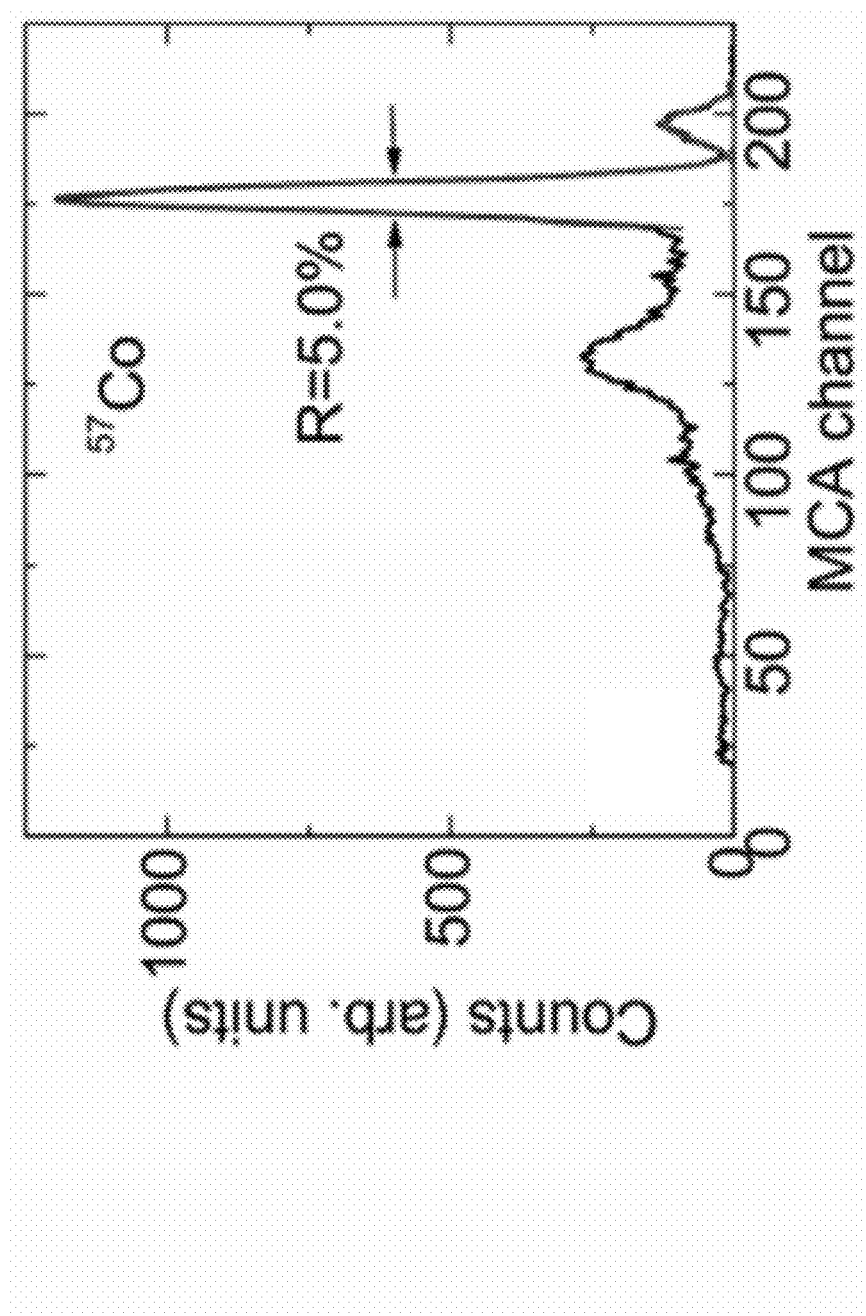
FIG. 5A is a graph of the pulse height spectrum (counts (in arbitrary units (arb. units)) versus channel) of a five-cubic millimeter ($mm^3$) crystal of strontium iodide ($SrI_2$) doped with 3 atomic percent (at %) europium (Eu) and codoped with 0.05 at % zirconium (Zr) under irradiation with cobalt-57 ($^{57}Co$). The arrows point to the sides of the photopeak.
Figure 5B:
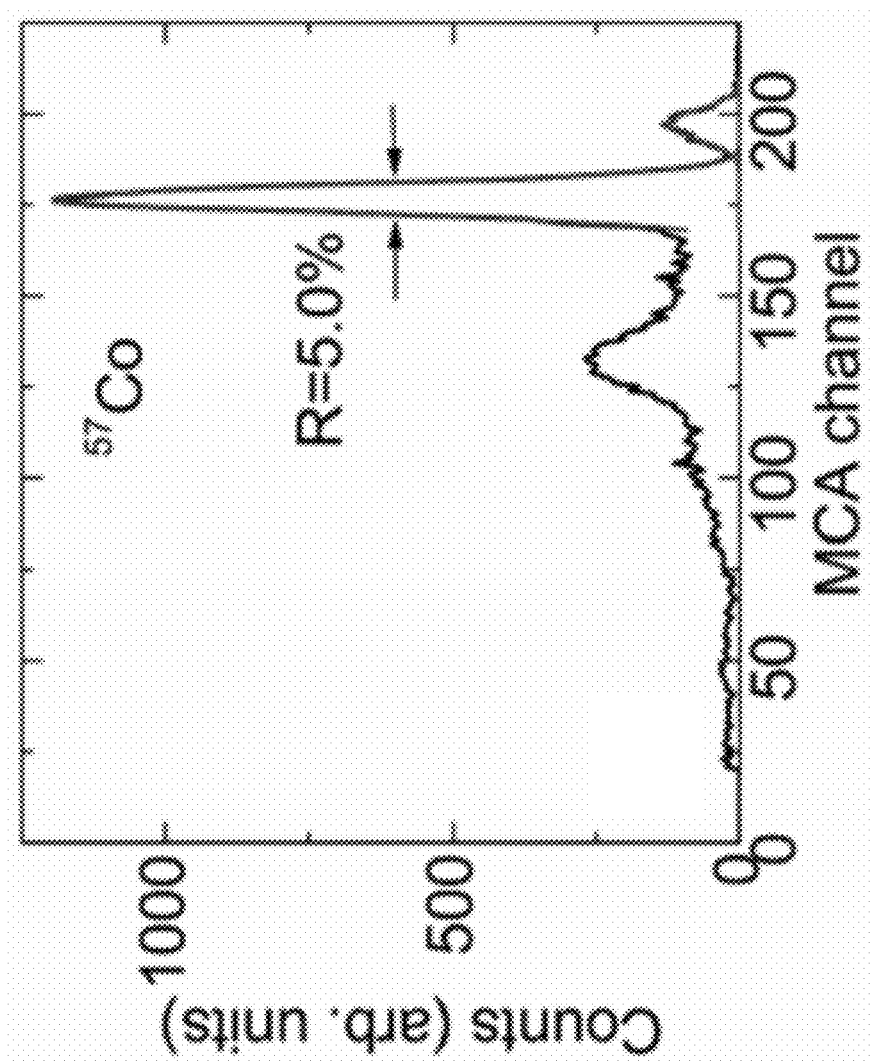
FIG. 5B is a graph of the pulse height spectrum (counts (in arbitrary units (arb. units)) versus channel) of a five-cubic millimeter ($mm^3$) crystal of strontium iodide ($SrI_2$) doped with 3 atomic percent (at %) europium (Eu) and codoped with 0.05 at % zirconium (Zr) under irradiation with cesium-137 ($^{137}Cs$). The arrows point to the sides of the photopeak.
Figure 5C:
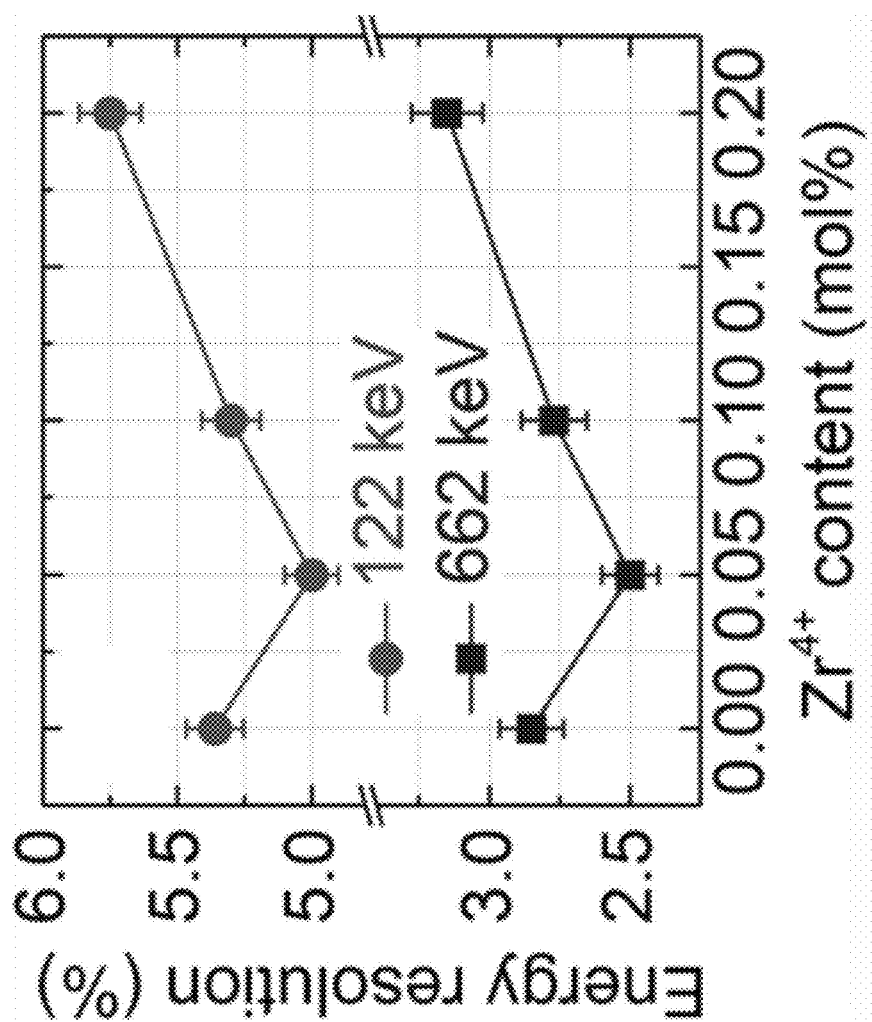
FIG. 5C is a graph of energy resolutions (in percent (%)) at 122 and 662 kiloelectronvolts (keV) of strontium iodide ($SrI_2$) doped with 3 atomic percent (at %) europium (Eu) and codoped with different amounts of zirconium (Zr) shown as a function of codopant ion content (in mole percent (mol %), ranging from 0 mol % to 0.2 mol %). Energy resolution data at 122 keV is shown in circles and energy resolution data at 662 keV is shown in squares.
Figure 5D:
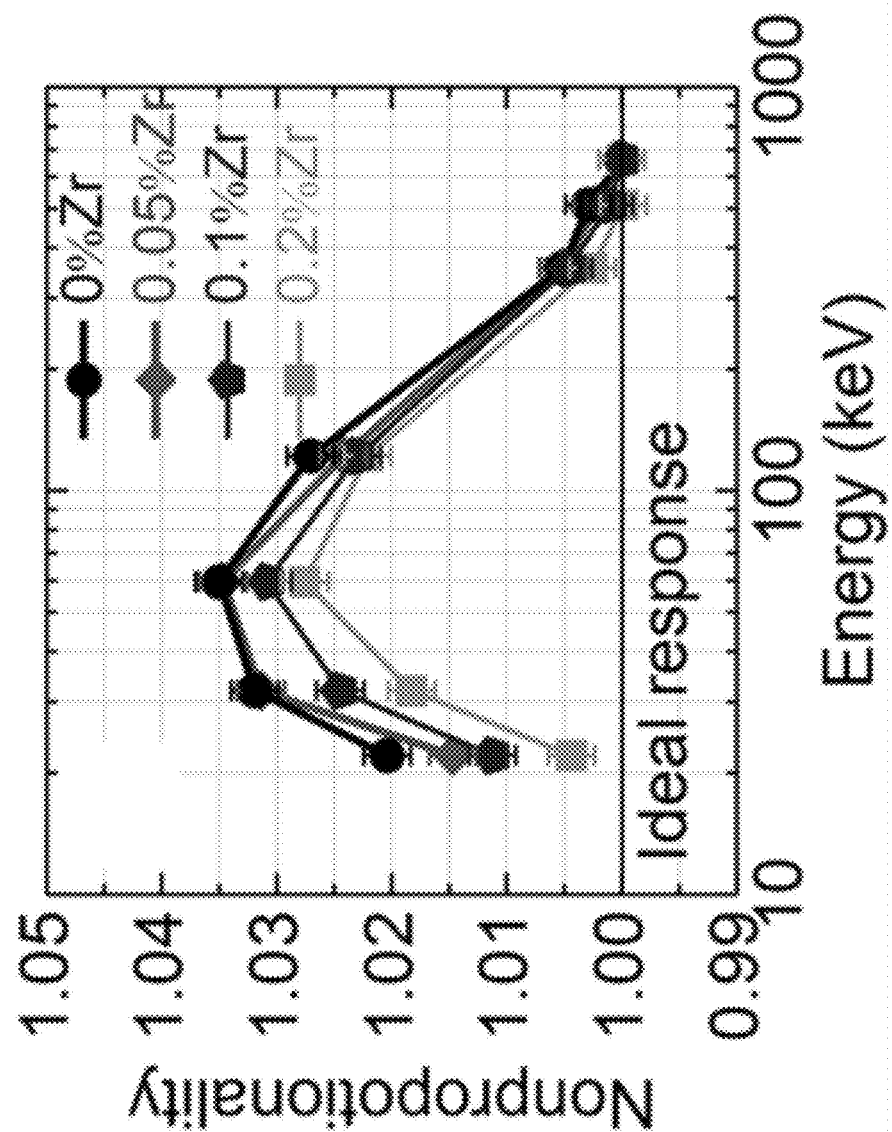
FIG. 5D is a graph of the nonproportionality (nPr) curves (nonproportionality versus energy (in kiloelectronvolts (keV)) of strontium iodide (SrI$_2$) doped with 3 atomic percent (at %) europium (Eu) and codoped with different amounts of zirconium (Zr). Curves are shown for non-codoped Eu-doped SrI$_2$ (0% Zr; circles), Eu-doped SrI$_2$ codoped with 0.05 at % Zr (0.05% Zr; diamonds), Eu-doped SrI$_2$ codoped with 0.1 at % Zr (0.1% Zr, pentagons); and Eu-doped SrI$_2$ codoped with 0.2 at % Zr (0.2% Zr, squares). The ideal response is shown by the straight line at 1.00 nonproportionality.

The energy resolutions of 5 mm³ non-codoped and $Zr^{4+}$ codoped $SrI_2$:$Eu^{2+}$ crystals at 122 and 662 keV were evaluated. The reported energy resolution for $SrI_2$ doped with 1 to 5 at % $Eu^{2+}$ is between 2.6 and 3.1% at 662 keV for a small size sample, such as a few cubic millimeters. See Alekhin et al., IEEE Trans. Nucl. Sci. 58, 2519 (2011); Boatner et al., J. Cryst. Growth, 329, 63 (2013); and Yokota et al., J. Cryst. Growth, 375, 49 (2013). The non-codoped sample studied here has a normal energy resolution of 5.36% at 122 keV and 2.85% at 662 keV. A beneficial effect on energy resolution improvement is observed with $Zr^{4+}$ codoping. As shown in FIGS. 5A and 5B, the energy resolution of $SrI_2$:$Eu^{2+}$ is improved to 5.0% at 122 keV and 2.5% at 662 keV in the 0.05 at % $Zr^{4+}$ codoped sample. However, when the $Zr^{4+}$ codoping concentration is further increased, the energy resolution at 662 keV degrades to 2.77% for 0.1 at % $Zr^{4+}$ and 3.15% for 0.2 at % $Zr^{4+}$. A similar trend is observed for the energy resolution at 122 keV. The energy resolutions at 122 and 662 keV as a function of $Zr^{4+}$ codoping concentration are plotted in FIG. 5C. For these samples with high light yield (>60,000 photons/MeV) and small size (in millimeters), the energy resolution is expected to be mainly determined by light yield non-proportionality. The measured channel number of the full energy peak at each gamma-ray energy was estimated, and the data were normalized to the response at 662 keV. The nPR curves of $SrI_2$:Eu single crystals codoped with different $Zr^{4+}$ concentrations are shown in FIG. 5D. A reduction in the "halide hump" (see Wu et al., CrystEngComm, 16, 3312 (2014)) is observed for the codoped samples, in particular, the 0.2 at % $Zr^{4+}$ codoped sample.

Figure 6A:
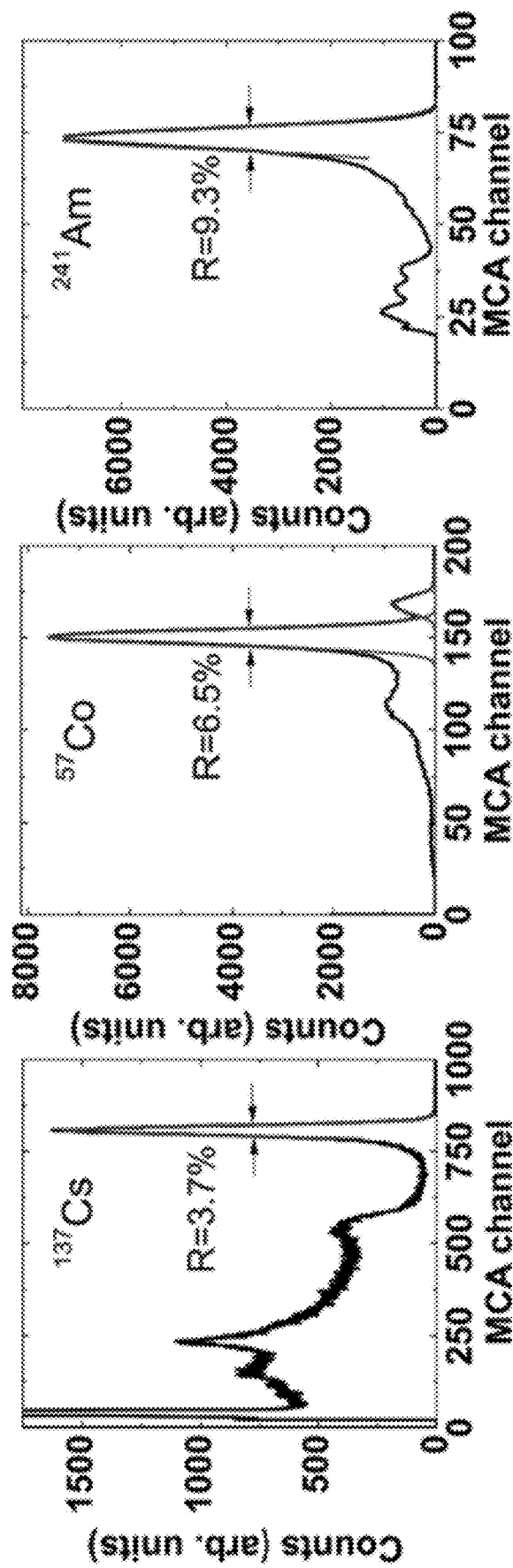
FIG. 6A is a series of graphs showing the pulse height spectra (counts (in arbitrary units (arb. units)) versus channel) for non-codoped strontium iodide (SrI$_2$) doped with 3 atomic percent (at %) europium (Eu) irradiated with different sources. Irradiation source from left to right is cesium-137 ($^{137}$Cs), cobalt-57 ($^{57}$Co), and americium-241 ($^{241}$Am). The arrows point to the sides of the photopeak.
Figure 6B:
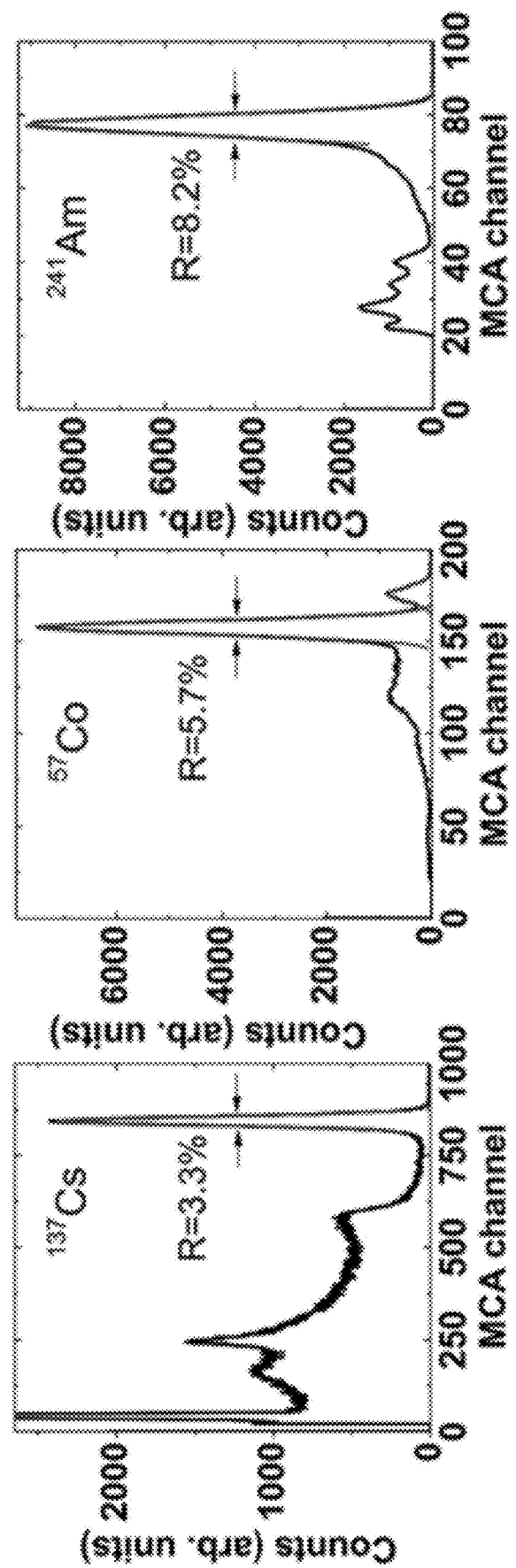
FIG. 6B is a series of graphs showing the pulse height spectra (counts (in arbitrary units (arb. units)) versus channel) for strontium iodide (SrI$_2$) doped with 3 atomic percent (at %) europium (Eu) and codoped with 0.05 at % zirconium (Zr) irradiated with different sources. Irradiation source from left to right is cesium-137 ($^{137}$Cs), cobalt-57 ($^{57}$Co), and americium-241 ($^{241}$Am). The arrows point to the sides of the photopeak.

The energy resolutions of non-codoped and 0.05 at % $Zr^{4+}$ codoped $SrI_2$:$Eu^{2+}$ samples with a larger size, i.e., Ø22 mm×10 mm, were compared. Pulse height spectra acquired under $^{137}$Cs, $^{57}$Co, and $^{241}$Am gamma-ray source irradiation are shown in FIGS. 6A and 6B. For the non-codoped sample, the energy resolution is 3.7% at 662 keV, 6.5% at 122 keV, and 9.3% at 59.5 keV, respectively. An energy resolution enhancement was achieved in the 0.05 at % $Zr^{4+}$ codoped sample. Upon codoping, the energy resolution can be improved to 3.3% at 662 keV, 5.7% at 122 keV, and 8.3% at 59.5 keV.

Example 4

Thermoluminescence Measurements

For each thermoluminescence (TL) measurement, a 5×5×5 mm cube sample was transferred from a glovebox by using a sealed amber jar, and then quickly taken out and mounted on the cold finger of a cryostat. The pressure was reduced to 2 mTorr, and the sample was then heated to 400 K to ensure that all traps were empty in the temperature range of interest. The samples were cooled to 5 K and irradiated by an X-ray generator (X-ray Model CMX003) at 35 kV and 0.1 mA for 3 minutes. Then, the sample was again heated to 600 K at a rate of 3 K/minute; noise due to thermo-ionic emissions precluded the acquisition of high-quality data above this temperature. A Hamamatsu H3177 PMT (Hamamatsu Photonics, Hamamatsu City, Japan) optically coupled to the cryostat's light transport interface was used to measure the spectrally unresolved emission from the sample. The PMT current signal was transformed into a voltage signal using standard National Institute Module (NIM) electronics. A National Instruments 6002-E data acquisition card (National Instruments, Austin, Tex., United States of America) was then used to digitize the voltage signal.

Results: Room temperature afterglow profiles indicated an enhanced afterglow effect with an increase in $Zr^{4+}$ codopant concentration. More particularly, the rate of initial decay decreases after $Zr^{4+}$ codoping, and the afterglow level afterward increases significantly. The room temperature afterglow of $SrI_2$:$Eu^{2+}$ originates from iodine vacancies acting as deep electron traps with a depth of around 1.0 eV below the conduction band minimum. See Wu et al., Cryst. Growth Des., 15(8), 2929 (2015); and Li et al., Phys. Status Solidi (b), 250, 233 (2013). In the present studies, the intensity of TL peaks between 250 and 400 K, corresponding to the iodine vacancy defects, increases by several times in comparison to that of non-codoped samples. Further, the intensity of low-temperature TL peaks between 40 and 50 K, corresponding to the shallow traps that can temporarily delay the free electron migration to $Eu^{2+}$ ions, increases to even saturation in the $Zr^{4+}$ codoped samples.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A scintillator material comprising Formula (II):

$$(A'_{1-x-y}M_xM'_y)X_2 \qquad (II);$$

wherein:
0.0001≤x≤0.1;
0.0001≤y≤0.005;
A' is one or more alkaline earth metal;
M is a dopant ion selected from the group consisting of In, Tl, Ce, Pr, Nd, Sm, Eu, Gd, Tb, Yb, Bi, Sb, and combinations thereof;
M' is a tetravalent codopant ion or a combination of tetravalent codopant ions; and
X is one or more halogen.

2. The scintillator material of claim 1, wherein A' is selected from Mg, Ca, Sr, Ba, and combinations thereof.

3. The scintillator material of claim 2, wherein A' is Sr.

4. The scintillator material of claim 1, wherein X is selected from Cl, Br, I, and combinations thereof.

5. The scintillator material of claim 4, wherein X is I.

6. The scintillator material of claim 1, wherein M is Eu.

7. The scintillator material of claim 1, wherein 0.001≤x≤0.05.

8. The scintillator material of claim 7, wherein 0.01≤x≤0.05.

9. The scintillator material of claim 8, wherein x is 0.03.

10. The scintillator material of claim 1, wherein M' is selected from the group consisting of $Ti^{4+}$, $Zr^{4+}$, $Hf^{4+}$, $Ge^{4+}$, and combinations thereof.

11. The scintillator material of claim 10, wherein M' is $Zr^{4+}$.

12. The scintillator material of claim 1, wherein 0.0005≤y≤0.002.

13. The scintillator material of claim 1, wherein the scintillator material is selected from the group consisting of $SrI_2$:Eu 3%, Zr 0.05%; $SrI_2$:Eu 3%, Zr 0.1%; and $SrI_2$:Eu 3%, Zr 0.2%.

14. A radiation detector comprising a photon detector and a scintillation material, wherein the scintillation material comprises a scintillator material of claim 1.

15. The radiation detector of claim 14, wherein the detector is a medical diagnostic device, a device for oil exploration, or a device for container or baggage scanning.

16. A method of detecting gamma rays, X-rays, cosmic rays, and/or particles having an energy of 1 keV or greater, the method comprising using the radiation detector of claim 14.

17. A method of altering the optical and/or scintillation properties of an alkaline earth halide scintillator material, the method comprising codoping the alkaline earth scintillator material with a tetravalent ion at a molar ratio of up to about 5000 parts-per-million (ppm) with respect to all cations, thereby providing an alkaline earth halide scintillator material comprising Formula (II):

$(A'_{1-x-y}M_xM'_y)X_2$ (II);

wherein:

$0.0001 \leq x \leq 0.1$;

$0.0001 \leq y \leq 0.005$;

A' is one or more alkaline earth metal;

M is a dopant ion selected from the group consisting of In, Tl, Ce, Pr, Nd, Sm, Eu, Gd, Tb, Yb, Bi, Sb, and combinations thereof;

M' is a tetravalent codopant ion or a combination of tetravalent codopant ions;

and

X is one or more halogen.

18. The method of claim 17, wherein the tetravalent ion is selected from the group consisting of $Ti^{4+}$, $Zr^{4+}$, $Hf^{4+}$, $Ge^{4+}$, and combinations thereof.

19. The method of claim 17, wherein the codoping alters one or more optical and/or scintillation property selected from the group consisting of energy resolution, photoluminescence decay time, scintillation decay time, and light yield.

* * * * *